US005626892A

United States Patent [19]
Kehoe et al.

[11] Patent Number: 5,626,892
[45] Date of Patent: May 6, 1997

[54] METHOD FOR PRODUCTION OF MULTI-FLAVORED AND MULTI-COLORED CHEWING GUM

[75] Inventors: Gary Kehoe, Ossining, N.Y.; Thomas J. Carroll, Oak Ridge, N.J.; Donald L. Mihalich, Brooklyn, N.Y.

[73] Assignee: Nabisco, Inc., Parsippany, N.J.

[21] Appl. No.: 158,067

[22] Filed: Nov. 24, 1993

[51] Int. Cl.⁶ .................................................. A23G 3/30
[52] U.S. Cl. .......................... 426/3; 426/4; 426/5; 426/6; 426/516
[58] Field of Search .................................. 426/3–6, 516, 426/249

[56] References Cited

U.S. PATENT DOCUMENTS

| | | |
|---|---|---|
| D. 271,344 | 11/1983 | Faust . |
| D. 271,439 | 11/1983 | Schumacher . |
| D. 271,534 | 11/1983 | Huzinec . |
| D. 271,535 | 11/1983 | Huzinec . |
| D. 271,536 | 11/1983 | Siecke . |
| 2,174,779 | 10/1939 | Delorme . |
| 3,482,992 | 12/1969 | Benson . |
| 3,492,131 | 1/1970 | Schlatter . |
| 4,127,372 | 11/1978 | Perla et al. . |
| 4,259,277 | 3/1981 | Hill . |
| 4,315,724 | 2/1982 | Taoka et al. . |
| 4,358,468 | 11/1982 | Dolan et al. . |
| 4,399,154 | 8/1983 | Puglia et al. . |
| 4,474,545 | 10/1984 | Mazzoni . |
| 4,485,118 | 11/1984 | Carroll et al. ........................ 426/5 |
| 4,524,081 | 6/1985 | Bansal . |
| 4,555,407 | 11/1985 | Kramer et al. . |
| 4,588,592 | 5/1986 | Elias .......................................... 426/5 |
| 4,597,970 | 7/1986 | Sharma et al. . |
| 4,722,845 | 2/1988 | Cherukuri et al. . |
| 4,775,537 | 10/1988 | Calabro et al. ......................... 426/3 |
| 4,808,418 | 2/1989 | Zamudio-Tena et al. . |
| 4,834,639 | 5/1989 | Eschbach et al. . |

(List continued on next page.)

FOREIGN PATENT DOCUMENTS

| | | |
|---|---|---|
| 2523836 | 8/1976 | Germany . |
| 1031536 | 5/1979 | Italy . |
| 58-94350 | 6/1983 | Japan . |
| WO92/04830 | 4/1992 | WIPO . |
| WO95/31108 | 11/1995 | WIPO . |

OTHER PUBLICATIONS

Kirk–Othmer Encyclopedia of Chemical Technology, 2nd Edition, vol. 5, pp. 857–884.

*Primary Examiner*—Esther Kepplinger
*Assistant Examiner*—Lien Tran

[57] ABSTRACT

Multi-veined chewing gum is produced by injecting a plurality of different liquid flavor/dye compositions into a substantially homogeneous gum base composition or into a laminated or coextruded gum composition. The injection may be performed while the gum composition is being conveyed in one or more extruder head barrels, the injection being at a plurality of radial and/or circumferential positions in the barrel. In embodiments of the invention substantially straight longitudinal veins of color are then partially mixed to partially displace the colored veins in a direction transverse to the direction of extrusion so as to create veined, multi-colored patterns substantially throughout a cross section of the product in a manner so that the multi-colored patterns in the cross-section differ along the length of the extrudate. The extrudate is cut to obtain gum pieces having different veins of injected liquid additives which provide a swirled or marbleized pattern in the opposing cut ends. The injected liquid additive compositions may include flavors, dyes, lakes, high intensity sweeteners, therapeutic agents, breath freshening agents, and mixtures thereof. Surface veins may also be produced by injection of liquid colorant/flavorant compositions onto the substantially homogeneous gum base composition as it passes through the extrusion head barrel. The surface veins may be disrupted or displaced independently of the interior veins using a rotatable sleeve or gum rope twisting device.

36 Claims, 9 Drawing Sheets

U.S. PATENT DOCUMENTS

| | | |
|---|---|---|
| 4,855,146 | 8/1989 | Murakami et al. . |
| 4,921,414 | 5/1990 | Schliehe et al. . |
| 4,971,806 | 11/1990 | Cherukuri et al. . |
| 4,978,537 | 12/1990 | Song . |
| 5,045,325 | 9/1991 | Lesko et al. . |
| 5,045,326 | 9/1991 | Glass et al. . |
| 5,088,909 | 2/1992 | Laarmann . |
| 5,108,762 | 4/1992 | Broderick et al. . |
| 5,110,608 | 5/1992 | Cherukuri et al. . |
| 5,114,724 | 5/1992 | Bottero . |
| 5,116,627 | 5/1992 | Rutherford et al. . |
| 5,125,819 | 6/1992 | Hager et al. . |
| 5,133,977 | 7/1992 | Patel . |
| 5,135,760 | 8/1992 | Degady et al. . |
| 5,145,696 | 9/1992 | Patel et al. . |
| 5,198,251 | 3/1993 | Song et al. . |
| 5,200,223 | 4/1993 | Simonsen . |

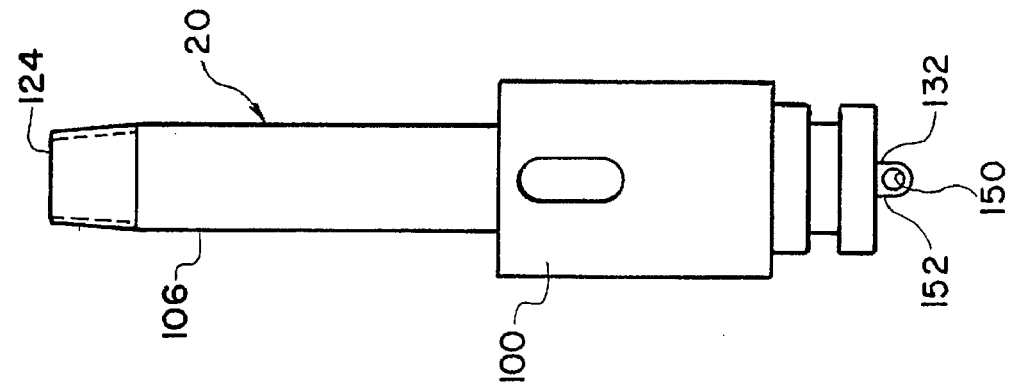
FIG. 10
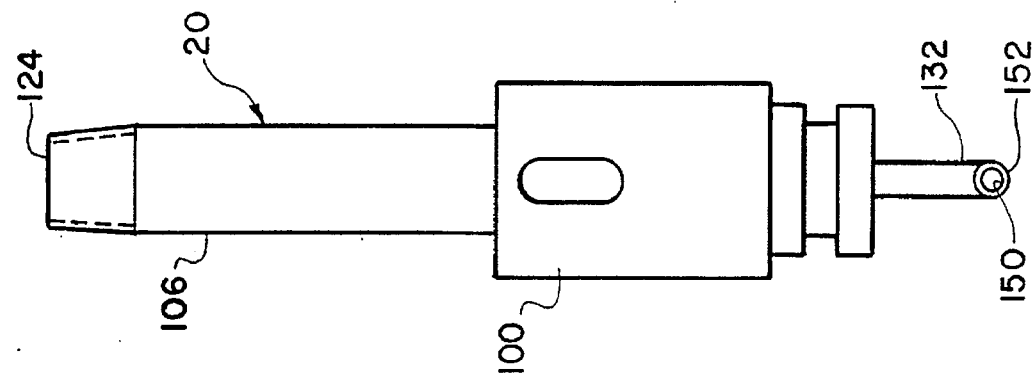
FIG. 9
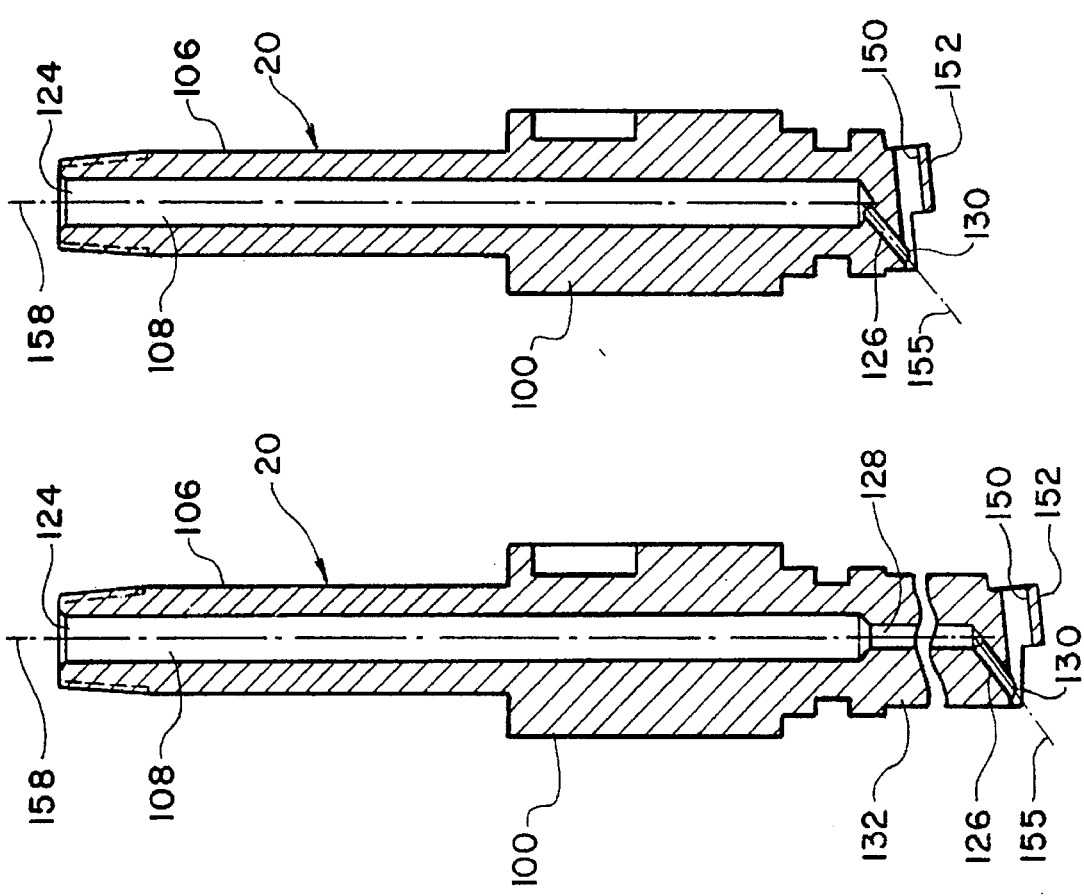
FIG. 8
FIG. 7

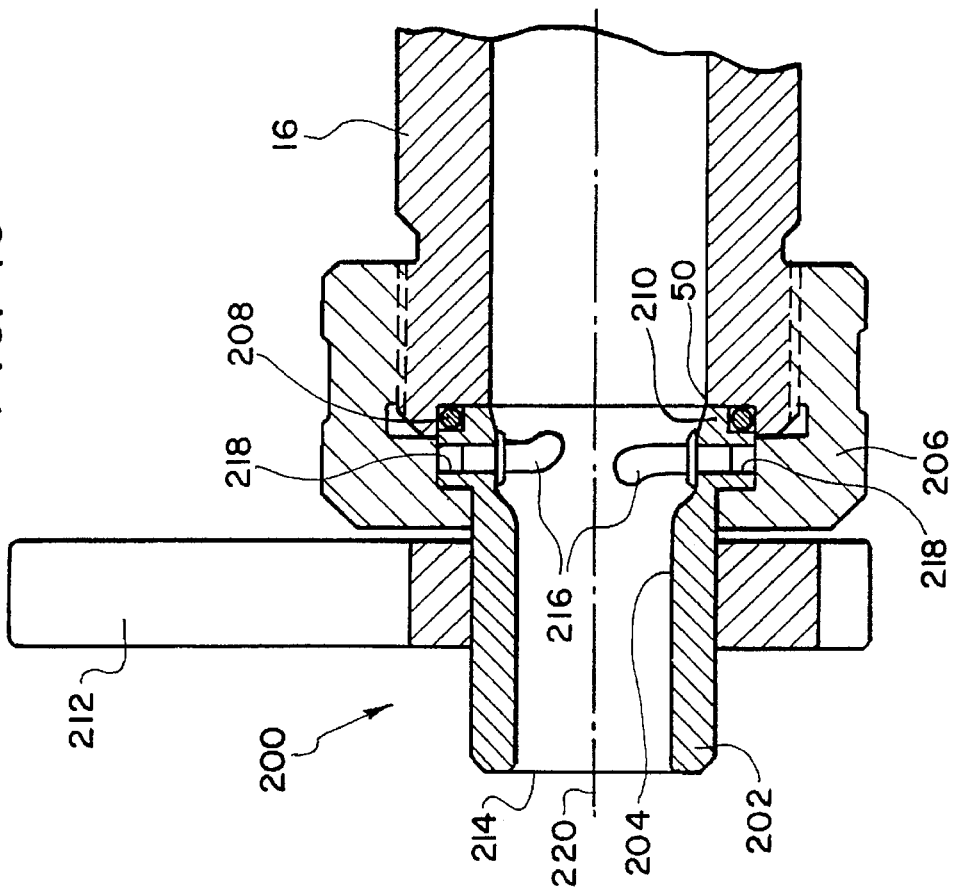

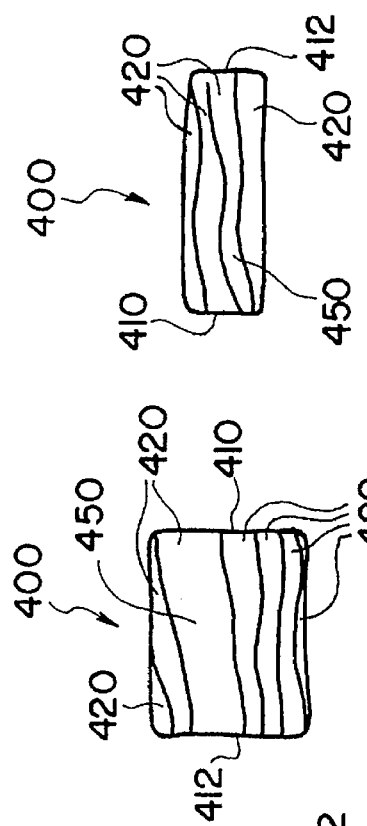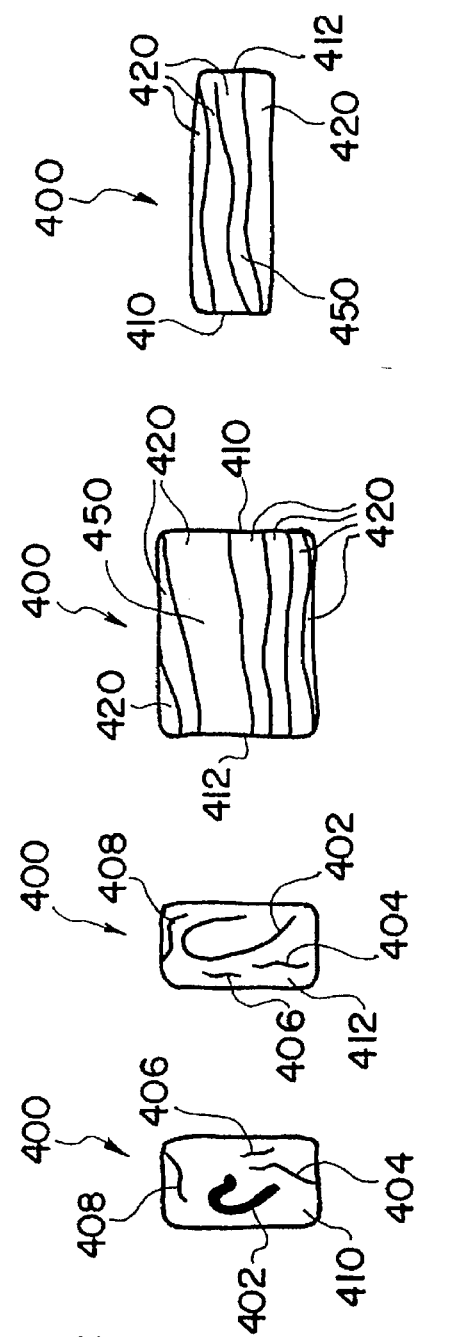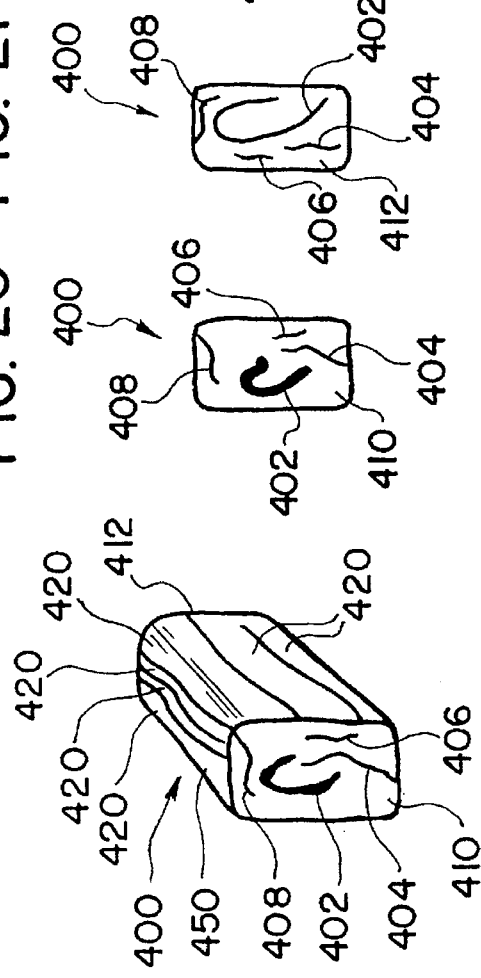

METHOD FOR PRODUCTION OF MULTI-FLAVORED AND MULTI-COLORED CHEWING GUM

FIELD OF THE INVENTION

The present invention relates to the production of chewing gum having discrete areas of flavorants, colorants, and other chewing gum additives. The present invention also relates to apparatus for producing the chewing gum.

BACKGROUND OF THE INVENTION

The dispersion of ingredients such as flavorants and colorants into chewing gum is disclosed in U.S. Pat. Nos. 4,399,154, 4,978,537, 5,045,326, 5,108,762, and Japanese patent publication no. 58-94350 published Jun. 4, 1983.

U.S. Pat. No. 4,399,154 discloses a coextruded chewing gum comprising an extruded center portion surrounded by and bonded to an extruded outer shell portion. Liquid flavor, it is disclosed, may be physically pumped into the core portion during coextrusion whereby the flavor will soak into the gum center but will not migrate into the outer or shell portion. The flavor may be injected into the chewing gum at one or several sites during the extrusion of the gum. Injection into the chewing gum at several sites of addition rather than one large center is preferred to enable flavor to more easily migrate into the body of the chewing gum. Smaller sites of liquid flavor addition, it is disclosed, will also minimize the occurrence of "voids" or pockets throughout the center which may interfere with organoleptic qualities. The coextruded chewing gum, it is taught, may be multi-colored and/or multi-flavored, that is, the core portion may be of a color and/or flavor different from the color and/or flavor of the outer shell portion.

U.S. Pat. Nos. 4,978,537 and 5,108,762 disclose gradual release structures for the release of active agents in chewing gum. The gradual release structures are formed by melt spinning techniques. The active agent may be a powdered flavor oil. They must be solid or in the form of powders including liquids encapsulated by spray drying techniques or liquids adsorbed or absorbed into or onto a supporting matrix. The structure is in the form of a fiber having a support matrix having an active agent dispersed throughout the support matrix.

U.S. Pat. No. 5,045,326 discloses injection of nitrogen gas into a bubble gum composition during a pressurized extrusion of the gum to obtain a non-staling reduced density bubble gum. A suitable extruder, it is disclosed, is a screw process extruder in which openings have been provided for incorporation of gas nozzles. The openings in the extruder, it is stated, should be formed in the center of the main auger extrusion tube area.

Japanese Patent Publication No. 58-94350 (published Jun. 4, 1983) discloses dispersing pigment in chewing gum base with gluten. Gluten, it is disclosed, results in a chewing gum of deep color and the pigment is hardly dissolved out during chewing.

The production of marbleized or veined extruded products other than chewing gum using multi-port injection and downstream partial mixing is disclosed in U.S. Pat. Nos. 2,174,779, 4,259,277, 4,474,545, 4,524,081, 4,921,414 and 5,088,909.

U.S. Pat. No. 2,174,779 discloses apparatus for extruding varicolored plastics, such as casein. The production of extruded cylindrical shapes which are variegated both as to cross section and surface is accomplished using a die and rotatable cylinder. The number of passages in the rotatable cylinder does not correspond with the number of passages through the die. Different colors are ejected from passages in the cylinder. The three passages of the stationery die are alternately fed by the four passages of the rotating cylinder ejecting alternate colors. The cylinder is fed with the plastic material of different colors by separate extruders.

U.S. Pat. No. 4,259,277 discloses a method and apparatus for injecting different colors into a stream of homogenized plastics material in the production of insulated electrical conductors having color codes on their surface. Different colored pigments are injected through probes which serve to divide the boundary layer of the plastics material to provide a space in which the pigment can flow. As the plastics material passes between the gears of a gear pump, the mass is masticated and the coloring pigments are mixed and somewhat dispersed in the basic plastics material. The major portion of the pigments remain in the boundary layer so as to result in an extruded product having clearly discernable strips of colorant on its surface.

U.S. Pat. No. 4,474,545 discloses a device for the production of multi-colored marble soaps from a base paste and one or more liquid pigments. Pressurized colored liquids are inserted in the base mass immediately upstream or in correspondence with a homogenizing means or perforated plate. A rotor is arranged between the perforated plate and the extrusion hole for providing partial mixing of the paste. The speed of rotation of the motor is adjustable from outside of the extrusion head and independent of the speed of the extrusion screw. The pressurized colored liquid circulates in a circuit, arrives at color distributing spokes, then after having passed through non-return valves is inserted into the compact material being processed. The rotor may be positioned in a conical length of the extrusion head or in the cylindrical section of the head.

U.S. Pat. No. 4,524,081 discloses the production of a marbled pet food by advancing a red pet food into a conduit and advancing a white pet food stream into a plurality of medial locations within the conduit by means of a plurality of nozzles. Stationary mixing elements are located within the conduit and are downstream of the nozzles. A moving mixing element can be employed in addition to the stationary mixing elements.

U.S. Pat. No. 4,921,414 discloses an extrusion apparatus for producing marbleized thermoplastic extrusions. The extrusion apparatus housing has an injector cavity in which is mounted an injection device for feeding in the thermoplastic marbling material. The injection device projects into the central passage. The injection device includes a plurality of injector ducts which open in the central passage at a variety of locations across the cross-section of the central passage. A wall of the central passage is provided with a riffled (helically ribbed) section or insert. The device is designed so that the central passage has a tapering constriction which narrows in the direction of the shaping outlet.

U.S. Pat. No. 5,088,909 discloses apparatus for extruding a marbleized synthetic resin strand. Rotation of a nozzle assembly causes an off-center opening to eject its inlay resin into the matrix resin mass in a passage at a location which moves within the matrix-resin mass.

The production of products having multi-colored patterns which are not chewing gums and which do not use multi-port injection in combination with downstream partial mixing is disclosed in U.S. Pat. Nos. 4,315,724, 4,358,468, 4,834,639, and 5,114,724.

U.S. Pat. No. 4,315,724 discloses a multi-color molding process and apparatus for injection molding of a multi-color pattern of more than three colors. A molten resin mixing manifold around which the injection units are disposed, has resin passages communicating with nozzles through check valves.

U.S. Pat. No. 4,358,468 discloses the preparation of a marbled meat pet food. An extruder delivers the white phase to the cylinder of an ingredient receiving compartment by means of circular tubing. The red meat ingredient is forced into the compartment by an auger. The downstream portion of the compartment has a plurality of fixed, stationery, flow-restricting generally helically-shaped baffles. As the rectangular bar of red phase with a central core of white phase is forced through the blending section, the material is split and axially turned. It is this splitting and turning which creates the required marbling of the red meat phase with the smaller quantity of white fat phase.

U.S. Pat. No. 4,834,639 discloses apparatus for making a thermoplastic product from a base plastic material and at least one marbling or veining additive material, namely another veining or marbling synthetic resin. The extruded product has a marbled structure which is defined as visible veins of the additive within the base material, and hence an appearance that is inhomogeneous to the eye in cross section and along the periphery—usually through and through. The extruded products may be used in the furniture industry for pieces having a wood-like grain. As the extruded strand of base thermoplastic is forced through a mixing head at various locations around and outwardly of the axis, streamlets of the additive thermoplastic are supplied via feed ducts to form internal veining surrounded by a continuous layer of the base thermoplastic.

U.S. Pat. No. 5,114,724 discloses the production of multicolor pasta products. The added color preferably forms a striped or checkered pattern on the pasta and extends through the pasta. Different colored pasta compositions are formed into separate sheets and cut into strips. The strips of the two or more various colors are assembled to create a pre-form pasta sheet.

Design patents DES 271,344, DES 271,439, DES 271,534, DES 271,535, and DES 271,536 show two color chewing gum.

U.S. Pat. No. 4,855,146 discloses the production of chewing gums with sectional motif patterns. The same motif pattern in sectional area is presented throughout the whole length of the gum.

U.S. Pat. No. 5,145,696 discloses adding a rolling compound mixture to a preformed gum matrix to improve flavor impact and extend flavor duration.

U.S. Pat. No. 4,971,806 discloses multi-layered chewing gum having different rates of flavor release. The chewing gum compositions of each layer comprise sweeteners, flavors, and optionally at least one other conventional chewing gum additive.

Chewing gums containing compositions for controlled release of flavor bearing substances are disclosed in U.S. Pat. Nos. 4,485,118, and 5,116,627. In the gum of U.S. Pat. No. 4,485,118, one flavor is encapsulated within a water-insoluble coating. A separate liquid flavor is introduced individually for immediate release. In the composition of U.S. Pat. No. 5,116,627, a multiplicity of sweetener bearing polymeric particles and/or flavor bearing polymeric particles are dispersed in a chewing gum base.

The extrusion of veined or marbled pastes such as chewing gum using a tube and shell collector-distributor is disclosed in Italian Patent Publication No. 1,031,536 (published May 10, 1979) and corresponding German Patent Publication No. 2,523,836 (published Aug. 19, 1976).

A heterogeneous chewing gum composition having long lasting flavor duration and a marbleized appearance is disclosed in U.S. Pat. No. 4,808,418. In the process of U.S. Pat. No. 4,808,418, a hard gum base is mixed with a soft gum base.

The introduction of chewing gum ingredients at different points along the length of a corotating twin screw extruder is disclosed in U.S. Pat. Nos. 5,045,325 and 5,135,760. In both processes, a substantially homogeneous chewing gum mass is produced.

Apparatus for making center-filled chewing gum is disclosed in U.S. Pat. No. 5,125,819. Chewing gum is extruded through an orifice to form a gum rope with a hollow interior of predetermined volume. A powdered center-filled material is poured into the hollow interior of the gum rope as it is being extruded.

The present invention provides for the production of chewing gum having discrete areas of colorant, flavorant, therapeutic, or other additives, ingredients or compositions. A plurality of liquid compositions are injected through individual injectors arranged both radially and longitudinally within an extruder and configured so as to avoid the creation of voids and flavor pools within the gum mass during and subsequent to injection.

Multi-colored and/or multi-flavored chewing gum may be produced by injecting a plurality of liquid flavoring and/or coloring ingredients into a chewing gum base of substantially greater viscosity to form different colored and/or different flavored stripes or veins. The stripes or veins may be partially disrupted to obtain a variegated pattern as to cross section but not as to the surface. Alteration of the internal pattern independently of alteration of a surface pattern may be achieved in the present invention.

The present invention also provides extrusion apparatus for the production of chewing gum having discrete areas of colorant, flavorant or other additives within a substantially homogenous base portion. A plurality of radially and longitudinally placed liquid injectors or probes are configured so as to avoid creation of voids or puddling in the gum mass downstream of the probes. The apparatus may be used to partially disrupt veins of the additive to obtain a variegated veined pattern as to cross section wherein the pattern differs substantially along the longitudinal direction of the extrudate. The apparatus may be used to create different patterns on the interior from those on the exterior of the gum extrudate.

Pieces of chewing gum produced in accordance with the present invention may differ substantially from one another internally even though they are cut sequentially from the same extrudate rope.

SUMMARY OF THE INVENTION

The present invention provides chewing gum comprising a plurality of discrete areas or portions of at least one colorant, flavorant, therapeutic agent, or other additive within one or more substantially homogeneous base portions. The chewing gum pieces are preferably in the shape of a cube or rectangular solid having opposing cut ends. In embodiments of the present invention, the gum pieces contain a plurality of different colored and flavored veins which are visible at the cut ends of the piece. The colored veins provide a pattern, preferably a swirled or marbleized pattern in the cut ends. One or more of the veins may extend from one cut end to the other cut end. The remaining outer surfaces, that is the surfaces between the cut ends, may also be multi-colored, preferably with a helical design.

In the process of the present invention, multi-colored chewing gum may be produced by supplying liquid dye and flavoring compositions to individual probes, nozzles or injectors which extend different distances into a barrel of an extrusion head of a chewing gum extruder or mixing device. The extrusion head may have one or a plurality of barrels each with its own set of injectors or probes. In addition to multiple radial positions or depths, the individual probes may be located at multiple positions along the length of each barrel of the chewing gum extruder head. The probes may also be arranged at multiple circumferential positions around the one or more barrels of the extrusion head. The flow rate to each probe or injector may be individually controlled by valves located in feed lines connecting a manifold to the probes. A different manifold may be used for each color. The manifold for a given color may supply the color to individual probes which extend into one or more barrels to different radial positions. For example, a probe may be arranged to supply a given color to the surface of the chewing gum composition, another probe may supply the color to the center of the chewing gum composition, and a third probe may supply the color to a radial position which is between the outer surface and the center of the chewing gum composition.

The probes are configured to taper from upstream to downstream so as to reduce the creation of voids in the chewing gum base and thereby eliminate puddling of the liquid additive composition. In addition, the interior of each of the extruder head barrels is preferably tapered from the upstream to the downstream direction so as to reduce the creation of voids. The chewing gum base preferably comprises a high DE corn syrup to improve resealing of the gum base into a unitary mass downstream of the probes to thereby reduce puddling or excessive accumulation of the liquid flavoring composition. The gum composition may be at a temperature of about 70° F. to 140° F., preferably from about 90° F. to about 110° F. during injection of the die/flavorant compositions or other liquid additive compositions. Each probe preferably contains a flexible, Teflon® check valve located over its exit orifice to prevent the gum composition from clogging the orifice due to back pressure in the extruder when production is stopped. The back pressure from the extruder closes the check valve.

The injection of the liquid compositions into the chewing gum extruder head results in essentially straight longitudinal veins in the interior and optionally on the surface of the chewing gum base while it is in the extruder head. However, these relatively straight interior longitudinal veins may be disrupted or displaced downstream of the probes by means of a rotatable mixing device. The rotatable mixing device partially mixes the veins into the gum base by laterally displacing them. The lateral displacement and stirring action is preferably varied independently of the extruder screw to produce colored patterns in the cross-section of the extrudate which vary substantially along the length of the extrudate. The internal stirring occurs without substantial disruption of the surface layer of the chewing gum mass. The stirring may be controlled manually or by the use of stepping motors to create colored patterns of random design along the length of the extrudate.

Subsequent to the internal stirring, the optional surface coloring and flavoring may be displaced with respect to the longitudinal axis of the chewing gum. The modification of the surface veins may be achieved before or after the liquid composition dries. For example, the surface coloring may be transformed into a helical pattern, such as present on the surface of peppermint sticks, by means of a rotatable sleeve at the extruder exit. In other embodiments of the present invention, the extrudate chewing gum rope is transported to a device which twists the rope when the liquid composition on the surface is dry. The device displaces the dried colorant with respect to the longitudinal axis of the extrudate rope but the colorant is essentially stationary with respect to the extrudate gum surface.

The dye/flavoring compositions or other liquid additive compositions may be about 15% to 25% miscible with the gum composition so as to maintain substantial pattern definition or substantially discrete areas of colorant, flavorant, or other additives. The substantial difference in viscosity between the liquid composition and the chewing gum base into which it is injected permits the achievement of capillary-like multi-colored cross sectional patterns which are visually apparent upon cutting of the extrudate in a direction transverse to its direction of extrusion.

BRIEF DESCRIPTION OF THE DRAWINGS

FIG. 7 is a schematic cross sectional view of a long nozzled interior injector.

FIG. 8 is a schematic cross sectional view of a surface injector.

FIG. 9 is a schematic front view of the interior injector of FIG. 7.

FIG. 10 is a schematic front view of the surface injector of FIG. 8.

FIG. 11 is a cross sectional view of the outlet or nozzle portion of an injector of the present invention.

FIG. 12 is a front view of the nozzle of FIG. 11.

FIG. 13 is a bottom view of the nozzle of FIGS. 11 and 12.

FIG. 14 is a side view of a flexible check valve for use with the injectors of the present invention.

FIG. 15 is a left side view of the flexible valve of FIG. 14.

FIG. 16 is a cross sectional view of a chewing gum surface disrupter device attached to an extrusion barrel.

FIG. 19 is a perspective view of a multi-colored and multi-flavored chewing gum piece of the present invention.

FIG. 20 is a front elevational view of the chewing gum of FIG. 19.

FIG. 21 is a rear view of the chewing gum piece of FIG. 19.

FIG. 22 is a side view of the chewing gum of FIG. 19.

FIG. 23 is a bottom view of the chewing gum of FIG. 19.

DETAILED DESCRIPTION OF THE INVENTION

The apparatus for the production of chewing gum in accordance with the present invention comprises a plurality of injectors for injecting a plurality of liquid compositions into a substantially homogeneous mixture of chewing gum ingredients to form a plurality of veins of the liquid compositions in the substantially homogeneous mixture of chewing gum ingredients. In preferred embodiments of the invention, the discrete substantially straight internal veins of liquid compositions are disrupted, displaced, or reoriented by a mixer which mixes the ingredients without creating a homogeneous mixture. The internal partial mixing of the veins results in discrete regions of the liquid composition preferably without substantial, if any disruption of the outer surface of the substantially homogeneous mixture into which the liquid compositions are injected. In preferred embodiments, a plurality of injectors are also provided for applying liquid compositions to the surface of the substantially homogeneous mixture so as to create external or surface veins of liquid compositions. In embodiments of the invention, the essentially straight surface veins are disrupted or distributed or displaced or reoriented either before or after drying of the liquid composition on the surface. Alteration of the surface veins may be achieved using a device which contacts the outer surface of the homogeneous mixture and applies force in a tangential or circumferential direction to the direction of movement of the chewing gum mixture. Thus, in preferred embodiments of the invention, the apparatus permits independent alteration of external veins and internal veins. However, in other embodiments, the internal mixing may be used to partially disrupt both internal and external veins. This may be accomplished, for example, by enlarging the size of the internal mixer and/or increasing its mixing speed.

Figure 1:
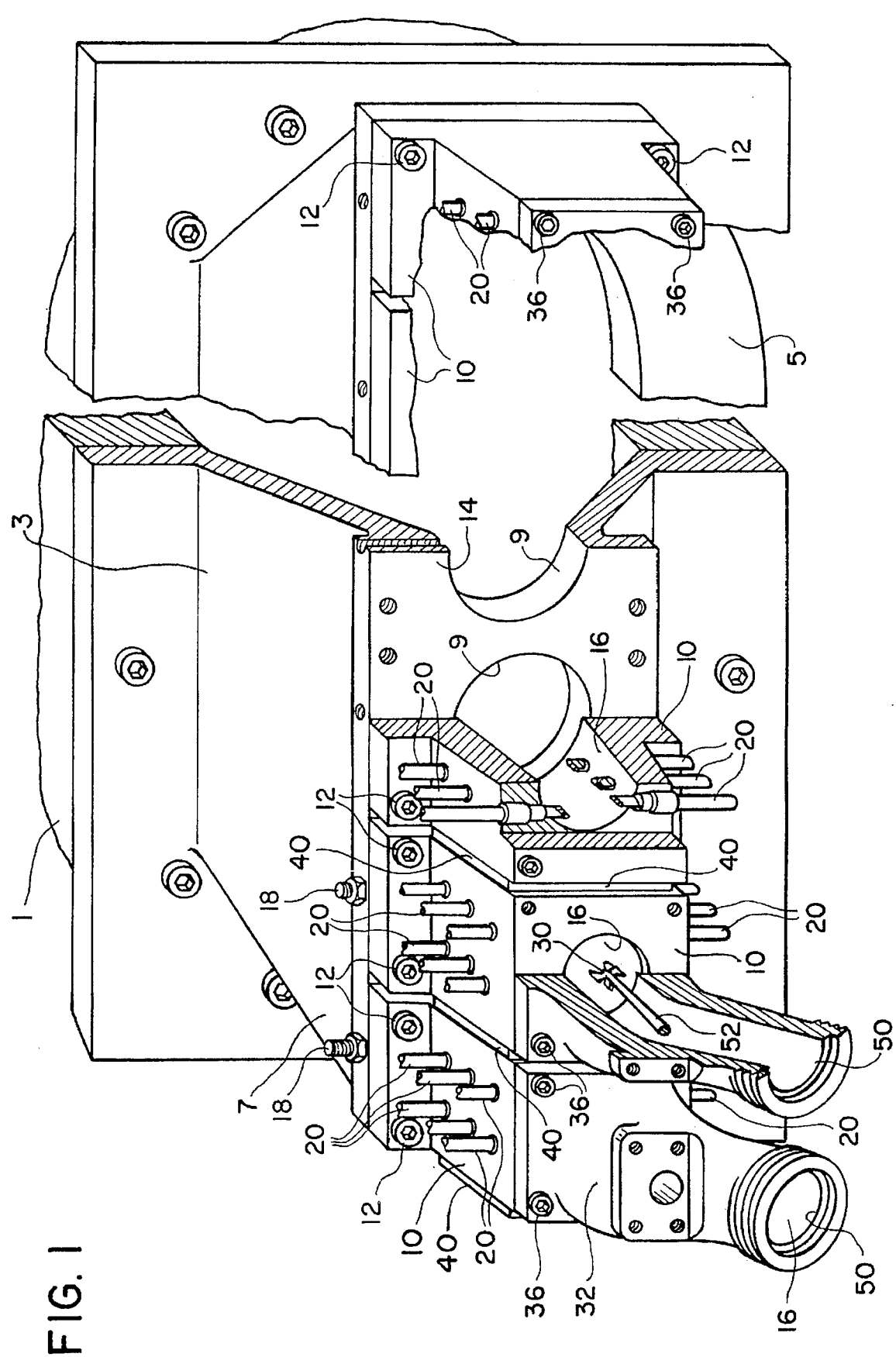
FIG. 1 is a perspective schematic view of a multibarrel chewing gum extrusion apparatus for producing a plurality of multi-flavored and multi-colored chewing gum ropes in accordance with the present invention.

Apparatus which may be used for the continuous production of chewing gum having a marbleized appearance or disrupted internal and external veins of chewing gum additives in accordance with the present invention is shown in perspective in FIG. 1. The apparatus comprises an extruder 1 or other mixing device which feeds a substantially homogeneous chewing gum mixture to an adaptor 3 which is bolted by bolts 4 or otherwise fastened to the output end or bonnet 5 of the extruder 1. The adapter 3 may comprise a downwardly sloping top portion 7 which directs the chewing gum composition towards outlet orifices 9 in the adapter 3. An extrusion head 10 is fixedly attached, by means of bolts 12 or other securing means, to the orifice end of the adapter for receiving chewing gum composition through the adapter orifice 9. In preferred embodiments of the invention, each orifice 9 of the adapter 3 has a separately removable extrusion head 10 with its own barrel 16 as shown in FIG. 1. However, a single extrusion head having a plurality of extruder head barrels which are in separate flow communication with each of the adapter orifices may be used. The use of separate extrusion heads 10 provides for greater flexibility in terms of equipment modification. Flow control bolts 18 extend through the adapter 3 into each adapter orifice 9 as shown in FIGS. 1, 2, 3, and 4 for controlling flow into each barrel 16.

In embodiments of the present invention, the substantially homogeneous chewing gum composition may be fed to the one or more extruder head barrels 16 by means of a continuous mixer, or counterrotating rolls, such as those of a calendar press, instead of by an extruder 1. An extruder 1 is the preferred means for feeding the dough into the extruder head barrels 16. The number of extruder head barrels 16 associated with an extruder may range from 1 to 12 or more.

The substantially homogeneous chewing gum mixture may be produced by mixing conventional chewing gum ingredients in at least one mixing apparatus such as an upright or batch mixer, a continuous mixer, or extruder. It may be continuously transferred or stored and then transferred via a hopper to the forming or shaping extruder 1, or other mixing and conveying device, for injection of the liquid compositions. In preferred embodiments of the present invention, the chewing gum ingredients may be added to and mixed to form the substantially homogeneous chewing gum mixture within an extruder 1 or continuous mixer having the adapter 3 and at least one extruder head barrel 16 attached to its output end 5. Conventional chewing gum extruders or mixing devices, modified to include the one or more extruder head barrels 16 of the present invention are preferred.

In embodiments of the invention, the liquid compositions may be injected into a plurality of substantially homogeneous chewing gum mixtures. For example, two or more chewing gum compositions may be coextruded to obtain a coextrudate comprising a plurality of different substantially homogeneous gum compositions. The coextrudate may then be injected with a plurality of liquid compositions at separate locations within the coextrudate. The injection locations may be in only one of the substantially homogeneous gum compositions or in a plurality of the substantially homogeneous gum compositions forming the coextrudate.

The coextrudate may be formed by the use of a coextrusion nozzle or die located upstream of the liquid composition injection zone. For example, a nozzle for supplying a second chewing gum composition may be located within adapter 3 or in a housing located between bonnet 5 and adapter 3. One or more coextrusion nozzles may be located upstream and in alignment with one or more orifices 9 for supplying separate coextrudates to each extrusion head barrel 16.

The coextrudate may be formed as a center-filled structure, laminated structure, or with sectional motif patterns. The chewing gum mixtures or compositions which are used to form each layer or section of the coextrudate may differ in color, flavor, texture, or combinations thereof. In preferred embodiments, the liquid compositions injected into each chewing gum mixture are coordinated in terms of flavor and/or color with the chewing gum composition into which it is injected. For example, the purple colored layer of a coextrudate or laminated chewing gum composition may be injected with a grape flavored liquid composition to obtain grape flavored veins. The yellow colored layer may be injected with a banana flavored liquid composition to obtain banana flavored veins.

Cutting of the liquid-veined coextrudate gum ropes provides pieces having a plurality of discrete regions of at least one injected chewing gum additive at separate locations in at least one of the cut ends of the pieces. The discrete regions may be located in one or in a plurality of the chewing gum compositions forming the chewing gum piece.

In the embodiment of FIG. 1, a plurality of extruder heads 10 each having a single barrel 16 is used to produce separate extrudate ropes, one from each barrel 16. Each extruder head barrel 10 has a plurality of injectors 20 for separately injecting a plurality of liquid compositions into different locations of the substantially homogeneous chewing gum mixture as the mixture flows past the injectors 20. The number of injectors 20 used in each barrel 16 may generally range from 3 to 20, preferably from 6 to 12.

Figure 2:
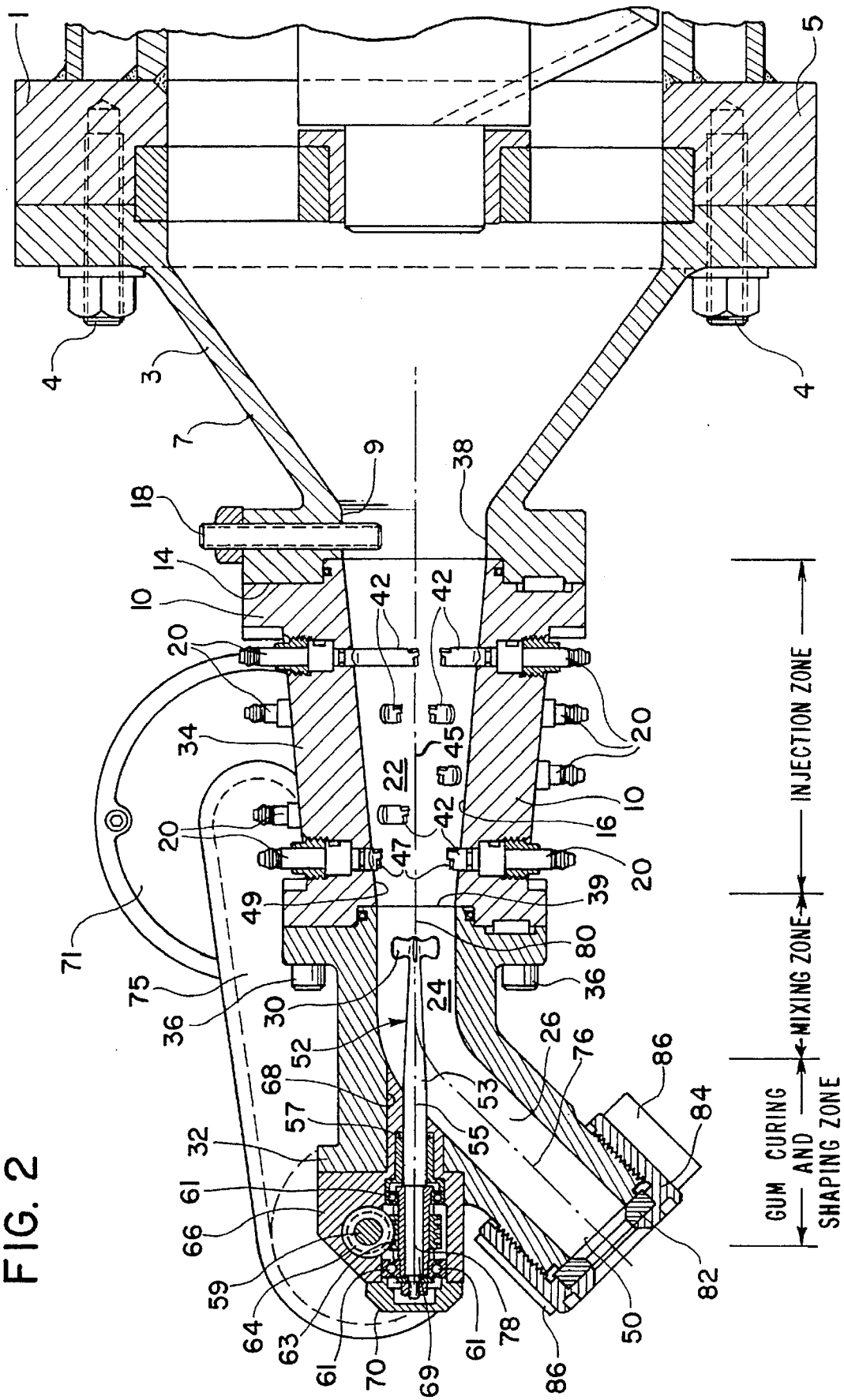
FIG. 2 is a cross sectional view through an extrusion head barrel of FIG. 1.

In preferred embodiments of the present invention, as shown in FIG. 2 each extrusion head barrel 16 comprises three zones: the injection zone 22, a mixing zone 24 downstream of the injection zone 22, and a gum curing and shaping zone 26 downstream of the mixing zone 24.

The mixing zone 24 and the gum curing and shaping zone 26 of each barrel 16 are preferably detachable from the injection zone 22 for cleaning and repair purposes as well as for changing the impeller 30 or mixer configuration or design. The impeller housing 32, which contains the mixing and gum curing and shaping zones 24, 26, may be fixably attached to the injection zone housing portion 34 of the extrusion head 10 by means of bolts 36 or other fastening means.

The Injection Zone

The injection zone 22 preferably has a larger internal diameter at its upstream end 38 than the diameter at its downstream end 39. Tapering of the barrel internal diameter from the upstream end 38 to the downstream end 39 of the injection zone 22 closes voids or passages created in the substantially homogeneous chewing gum mixture as it flows past the injectors 20. The taper promotes resealing of the chewing gum mass in the areas of injection. In the injection zone 22, mixing means are not provided so as to promote laminar flow or plug flow and the creation of substantially straight longitudinally oriented veins of liquid additive composition.

Figure 3:
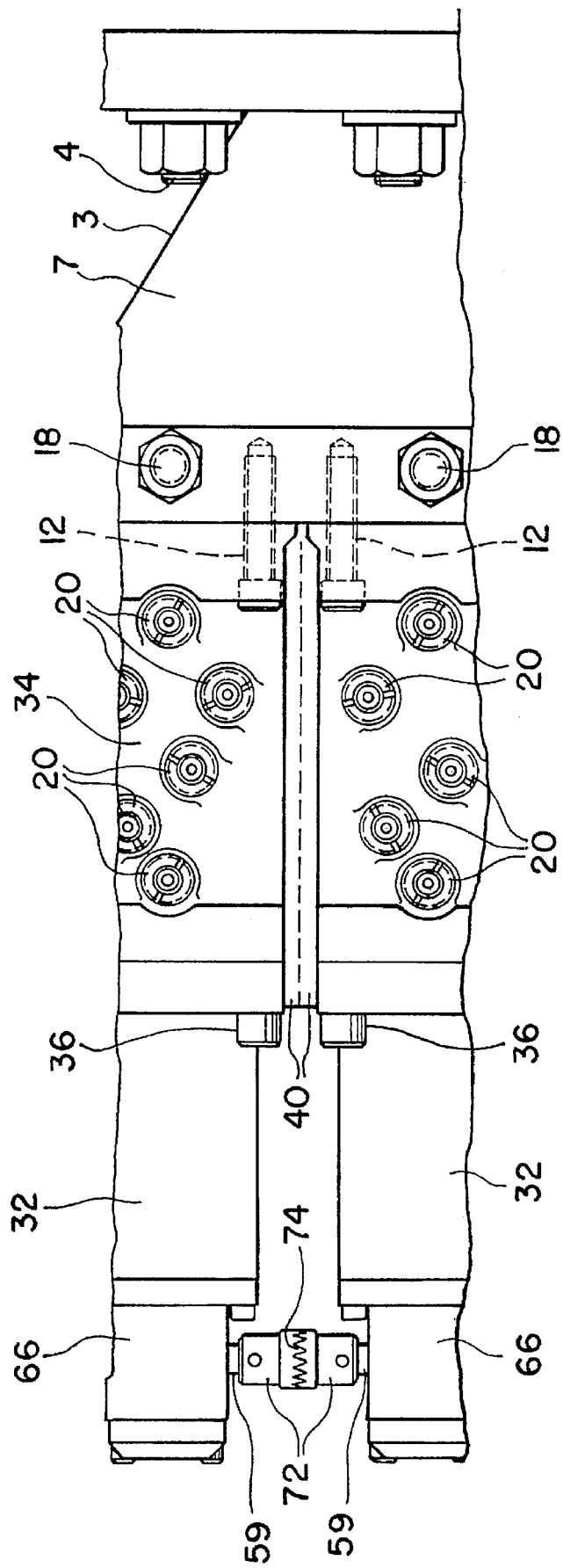
FIG. 3 is a partial top view of the apparatus of FIG. 1 showing an impeller drive shaft coupling and an injector arrangement.

As shown in FIGS. 1 and 3, the injection zone 22 may comprise external heaters 40, such as one or more band heaters or heating pads with one or more temperature regulators (not shown) for independently controlling the temperature of the chewing gum composition entering, flowing through, and leaving the injection area 22. The heaters 40 and regulators are used to control curing and sealing of the chewing gum. The external heaters 40 preferably include a heater band, controlled by a temperature regulator (not shown) located for heating the gum in the injection zone 22 just downstream of the injectors. This downstream portion or area of the injection zone 22 increases the dwell time or residence time of the gum in the extrusion head barrel 16 downstream of the injectors 20 so as to promote sealing of the gum composition internally and to spread color applied on the surface of the gum composition.

Injector Arrangements

Injectors 20 for injecting the liquid compositions into the interior of the chewing gum composition extend different depths into the extrusion head barrel 16 for providing veins at different interior locations. The depth to which each injector 20 extends into the barrel 16 may be adjusted, preferably by changing the length of the nozzle 42 or outlet portion of the injector 20. Thus, the injectors 20 or probes may inject a liquid composition at or near the central longitudinal axis 45 of the barrel 16 and chewing gum composition, and at a plurality of radial positions or depths intermediate the longitudinal axis and the surface of the chewing gum mixture. As shown in FIGS. 1, 2, and 3, the individual injectors 20 or probes may be located at multiple positions along the length of each barrel 16 of the chewing gum extruder head 10. In addition, as shown in FIGS. 1 and 3, they may also be arranged at multiple circumferential positions around each barrel 16 of the extrusion head 10. For a given barrel 16, the penetration depth of the injectors 20 may be the same or different along the length of the barrel 16. Penetration depth may also vary from one circumferential position to another for a given barrel 16.

Injectors 20 for applying the liquid composition to the surface of the chewing gum mixture may extend slightly into the extruder barrel 16 or may have their outlet end 47 or terminus substantially flush with the internal diameter or wall 49 of the barrel 16. The injectors 20 for the chewing gum surface may be disposed at a plurality of longitudinal positions and/or a plurality of circumferential positions for applying a plurality of longitudinal veins or stripes at different circumferential or peripheral positions on the chewing gum mixture.

The arrangement of interior and surface injectors 20 may be the same or different for each extrusion head barrel 16. In embodiments of the present invention where a plurality of extrusion head barrels 16 are used to produce a plurality of extrudate ropes, the injectors 20 are preferably disposed at top and bottom locations of the extrusion head barrels 16. This type of arrangement, as shown in FIGS. 1 and 3 permits closer arrangement of the barrels 16 to each other in a horizontal direction which promotes more even flow through each of the barrels 16 and saves space.

Figure 4:
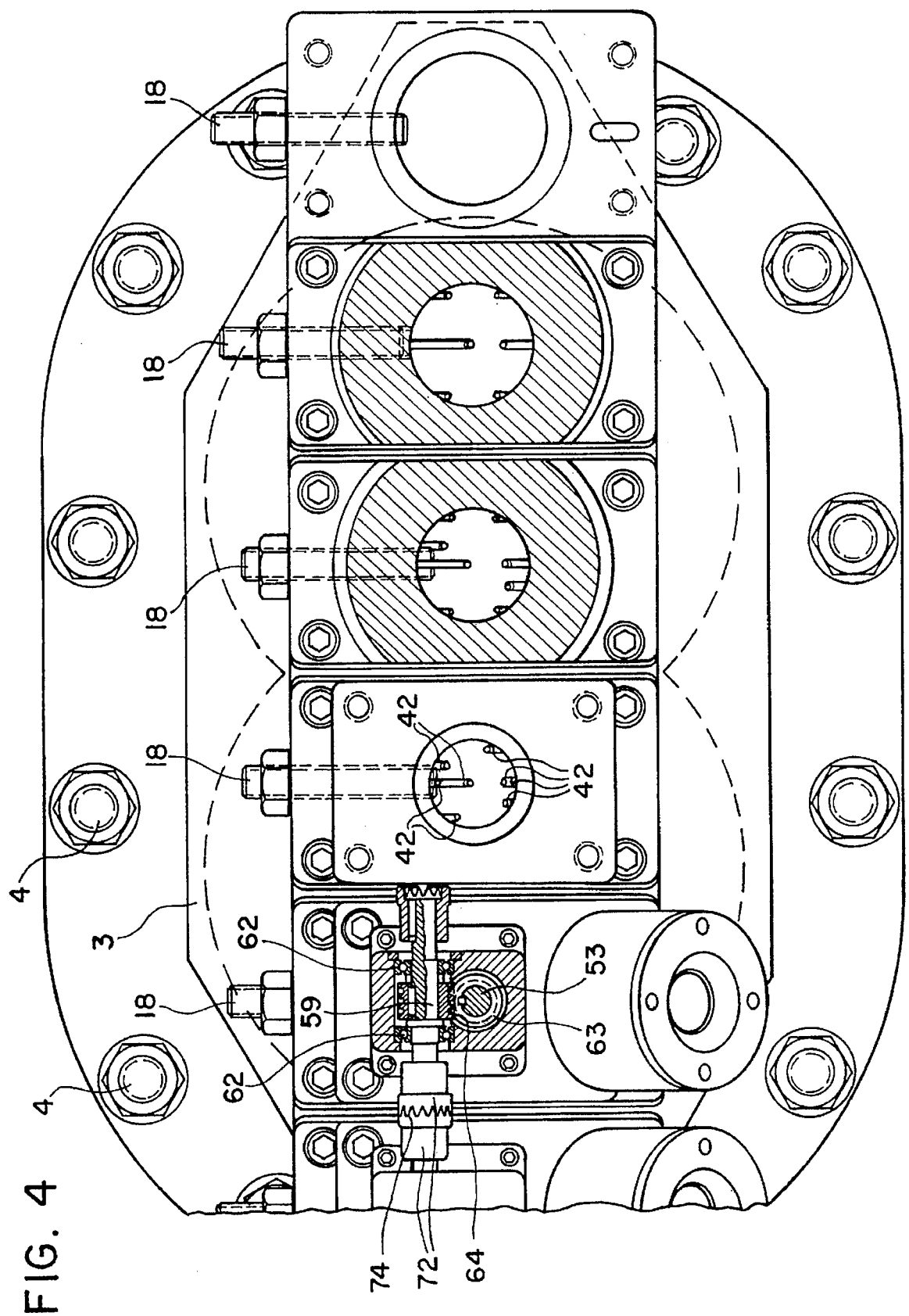
FIG. 4 is a partial front elevational view of the apparatus of FIG. 1 showing front cross sectional views of the impeller drive and the injection zone.

In preferred embodiments, the injectors 20 are arranged so that separate, discrete veins are created in the homogenous mixture by each of the injectors 20. This may be achieved by arranging each injector 20 as shown in FIGS. 3 and 4 so that the outlet orifice for each nozzle 42 is at a different location either radially or circumferentially with respect to the central longitudinal axis 45 of each extrusion head barrel 16. Thus, two or more outlet orifices may be at the same radial position (that is the same distance from the central longitudinal axis 45) provided they are at different circumferential positions. Nozzles 42 arranged at different longitudinal positions along a given barrel 16 may be disposed at different radial positions and/or different circumferential positions to create separate, discrete longitudinal veins.

In other embodiments, nozzles 42 may be positioned one behind the other along the length of the extruder barrel 16 (that is, at the same circumferential position) and at the same radial position to obtain partial mixing of two liquid compositions. By intermittent operation or injection through the aligned injectors 20, longitudinal veins which differ along their length may be obtained.

Surface injectors are preferably located in the larger diameter upstream portion of the tapered barrel 16. Locating the surface injectors further away from the barrel exit 50 and receding the injector just slightly into the injector cavity reduces the production of brown discolorations between injected secondary surface colors. When placing interior injectors into the smaller diameter portion of the tapered barrel 16, the longer injectors are positioned so as to avoid touching each other which would result in bending of the injectors.

The Mixing Zone

In the mixing zone 24 of the extrusion head barrel 16, a mixing means 52 extends into the barrel 16 for partially mixing or partially distributing one or more of the injected liquid composition veins created upstream of the mixing means 52. In preferred embodiments of the invention, the mixing means 52 comprises a shaft 53 which terminates in an impeller 30. The impeller 30 is preferably dimensioned so that mixing of the chewing gum composition as it passes or flows past the impeller 30 is substantially or completely confined to the interior or core portion of the chewing gum composition so that the surface of or exterior portion of the chewing composition undergoes little or essentially no alteration by the mixing means 52. The longitudinal axis 55 of the shaft and the center of the impeller 30 are preferably aligned with the central longitudinal axis 45 of the barrel 16.

The impeller 30 may be an axial-flow impeller or a radial-flow impeller. Axial-flow impellers include impellers in which the blade makes an angle of less than 90° with the mixer axis. Propellers, fan turbines, and pitched paddles are representative axial-flow impellers. The mixer shaft 53 may include one or more sets of paddles, or propellers spaced along the length of the shaft 53. Radial-flow impellers have their blades parallel to the axis of the drive shaft 53. Radial-flow impellers, such as a turbine, normally provide circulation of a fluid throughout a mixing vessel and may be used in embodiments where partial mixing or disruption of the surface of the chewing gum is desired.

In preferred embodiments of the present invention, a propeller, mounted at the end of the shaft 53 is used to avoid mixing of color or other additives on the surface. Use of a propeller and shaft for internal mixing, have little effect, if any, on the surface when rotated at a wide variety of speeds in preferred embodiments of the present invention. The shaft 53 is preferably driven by a variable speed motor. Connection of the impeller 30 and shaft 53 may be directly or indirectly to the drive motor. Slower impellers may be driven through a speed reducer which are known in the art. The impellers 30 for each barrel 16 may be individually driven or driven by a common motor. In embodiments where a common drive motor is used, the speeds of the individual impellers may be independently controlled by the use of known speed reducers, gears, pulleys, and the like. Known variable speed motors, and stepping motors may be used to drive the mixers 52.

Motors having sufficient horse power to drive the shaft at least about 60 rpm, preferably at least about 100 rpm, for example from about 150 rpm to about 350 rpm may be used in the present invention.

Figure 5:
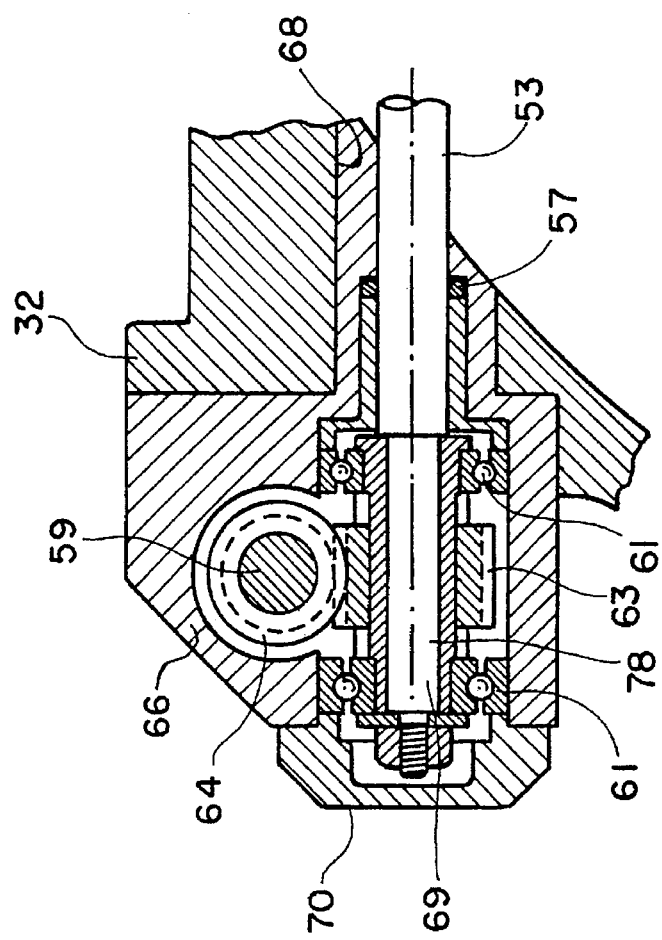
FIG. 5 is a detailed cross sectional side view of the impeller housing and drive.

In embodiments of the present invention, the mixer shaft 53 extends from the mixing zone 24, through at least a portion of the gum curing and shaping zone 26 of the barrel 16 into the impeller housing 32. Seals, such as ring seals 57 may be used to prevent entry of the chewing gum ingredients into the impeller housing 32. The impeller shaft 53 may be connected to the impeller drive shaft 59 by means of bearings 61, 62 and helical gears 63, 64 as shown in FIGS. 2, 4, and 5. The impeller housing 32 comprises an impeller drive housing 66 which fits into and is secured within a cavity 68 in the impeller housing 32. Access to the impeller drive 69 for removal thereof may be achieved by removing an end cap 70 which may be secured into the impeller drive housing 66 by means of internal and external threads (not shown). Access to the impeller shaft 53 may be achieved by removing the impeller drive housing 66.

Where a common impeller drive shaft motor 71 is used, the impeller drive shafts 59 may be connected to each other by coupling means 72 as shown in FIGS. 3 and 4. The coupling means 72 may comprise teeth 74 for matingly engaging or joining the individual impeller drive shafts 59. The common drive motor 71 may be connected to the drive shafts 59 by means of a belt and pulley arrangement 75 or known speed controllers and gear arrangements.

In embodiments of the present invention, static disrupters or hand operated disrupters or mixers may be used, particularly where only slight distortion or disruption of the interior veins of liquid additive, such as color veins, is desired.

Gum Curing And Shaping Zone

The chewing gum curing and shaping zone 26 is preferably angled with respect to the injection zone 22 and mixing zone 24. For example, the central longitudinal axis 76 of the curing and shaping zone 26 may be at about a 30° to about a 60° angle with the central longitudinal axis 45 of the injection zone 22. Angling of the barrel 16 in the curing and shaping zone 26 at for example 45°, permits alignment of the central longitudinal axes 55, 78, 80 and 45 of the propeller shaft 53, impeller drive 69, the mixing zone 24, and the injection zone, 22, respectively. This arrangement provides a barrel area downstream of the mixing zone 24 where the chewing gum composition is not subjected to internal mixing and where voids created by the impeller 30 may be resealed.

The angling of the gum curing and shaping zone 26 may be downward, as shown in FIG. 1. The angling may involve one or more additional orientations such as sideways and upward angling to accommodate downstream equipment such as gum rope conveyors or cutters. For example, to accommodate an upwardly inclined conveyor belt, zone 26 may be goose neck shaped with an upwardly inclined section leading into a downwardly inclined section.

The surface injectors 20 are preferably positioned off center of the central longitudinal axes 45, 80 of the injection zone 22 and mixing zone 24 so that surface veins pass around or to the sides of the propeller shaft 53 at its point of entry into the barrel 16 to thereby avoid or minimize disruption of the surface veins by the propeller shaft 53. The length of the gum curing and shaping zone 26 should be sufficiently long so as to permit curing of the gum composition and the attainment of a proper viscosity for shaping the composition and retaining the shape upon extrusion through an extrusion die 82 at a desirable production rate.

In embodiments of the present invention, the exit end 50 of the gum curing and shaping zone 26 of the barrel comprises an extrusion sizing die 82 which may be retained in place by a gland 84. The die orifice diameter is preferably smaller than the diameter of the barrel end 50 so as to provide shaping of the extrudate. The die 82 controls the final shape and size of the extrudate rope exiting from the extrusion head barrel 16 or nozzle. The sizing die 82 may flare outwardly and optionally have a serrated surface. Serration promotes the achievement of a striped appearance. The points of the serrations displace surface color and expose the gum color below the surface. Thus, increasing the number of serrations increases the number of stripes which alternate between the surface color and the gum color.

In preferred embodiments of the invention, external heating means 86 are provided at the barrel exit 50 for controlling gum viscosity and consistency. A thermometer or thermocouple (not shown) may be placed inside the die 82, or die plate coupling or retaining gland 84. As shown in FIG. 2, a heater band 86 may be mounted around the coupling or gland 84 that holds the die 80 or die plate. The temperature of the heater band 84 may be controlled by a regulator (not shown) which receives input from the thermometer or thermocouple placed in the die plate coupling 84. Excessive heat will melt the chewing gum or cause sticking of the gum to conveyer belts or cutters. In addition, excessive heat may also result in premature rope cracking. Too little heat may cause unacceptable nozzle or barrel back pressure and increase drying time for the surface colors or other additives. Exemplary nozzle exit temperatures may range from about 110° F. to about 140° F., preferably from about 125° F. to about 130° F. at a mass flow rate of about 80 pounds per hour.

The Injector Feed System

The liquid additive compositions may be fed to the injectors 20 by means of pumps, compressed air, and other known liquid delivery systems. Exemplary liquid delivery systems are: 1) plunger style metering pumps with pulsation dampeners and back pressure regulators, and air pressurized tanks having one or more compartments for accepting and delivering different liquid systems in each compartment. A compressed air system is preferred for ease of regulation, cleaning, and ability to precisely dispense a large number of different liquid compositions. The pressure tank system may be fitted with a compressor for pressurizing the liquid compositions held in the tank.

In preferred embodiments of the present invention a manifold is employed for feeding a given liquid composition to one or a plurality of injection nozzles 20. The manifold may also be used to combine any given plurality of liquid compositions into a single liquid composition for delivery to one or more injectors 20. For example, paired injectors may share the same color reservoir through the manifold. Each of the liquid delivery lines connecting the manifold to each injector preferably has its own separate metering valve. This permits different pumping rates of the same color or other liquid additive composition. Primary colors may be combined for example, to obtain secondary colors by means of a manifold for delivery to one or more injectors 20.

The Injectors

Figure 6:
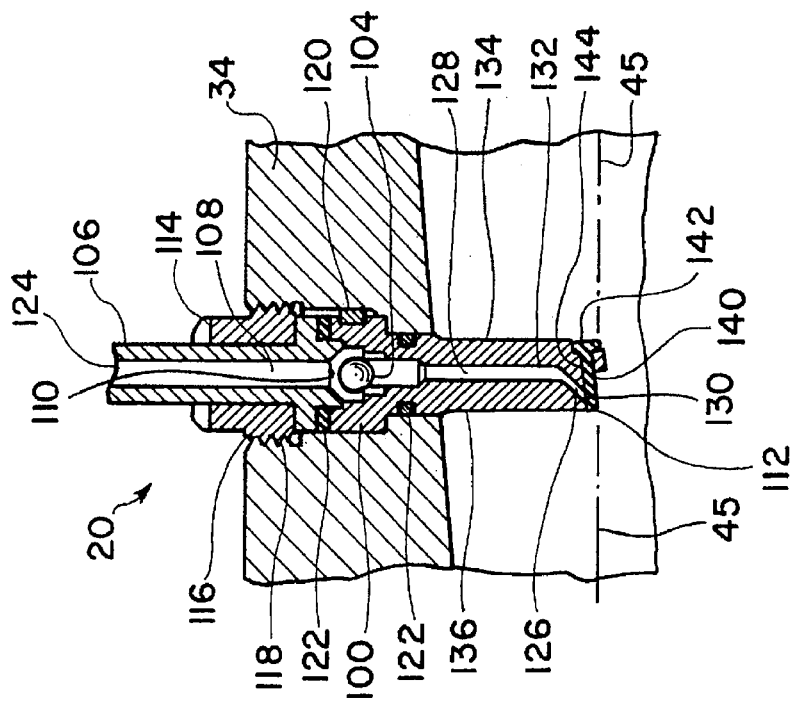
FIG. 6 is a cross sectional view of an injector mounted in the injection zone of FIG. 1.

In preferred embodiments of the present invention, the liquid composition injectors 20 or nozzles, as shown in FIG. 6 have a body portion 100 having a central cavity 102 therein for holding a spherical or other known check valve 104. A stem or inlet portion 106 having a central longitudinal inlet passageway 108 terminates at and is in fluid communication with the check valve chamber 102. The inlet portion or stem 106 of the injection nozzle 20 may comprise a coupling or may be tapered for receiving a hose or other conduit which supplies the liquid composition to the injector 20. Back pressure on the optional spherical check valve 104 causes it to seat at the terminus 110 of the stem 106 or inlet passageway thereby preventing backflow of the chewing gum composition and liquid composition if the external check valve 112 fails. The stem 106 passes through a gland 114 having external threads 116 for mating with threads 118 in the injection zone housing 34 of the extrusion head 10. The threads 116 of the gland 114 and a key 120 which fits onto the external portion of the injector body 100 serve to secure the injector 20 within the injection zone housing 34. Seals 122, such as rubber rings may be used to provide a liquid seal between the stem portion 106 and the body portion 100 as well as between the body portion 100 and the injection zone housing 34. The stem portion 106 and the body portion may be attached to each other by threads or other securing means. In other embodiments, such as where an internal check valve 104 is not used, the stem 106 and the body 100 may be integral.

As illustrated in FIGS. 6, 7, 8, 9, and 10, liquid composition is received in an inlet orifice 124 of the inlet portion or stem 106 of the injector 20. The liquid composition is passed from the inlet orifice 124 by means of an inlet passageway 108, past the optional spherical check valve 104, and into an outlet passageway 126. The inlet passageway 108 and the outlet passageway 126 are in fluid communication with each other when the spherical check valve 104 is open. Fluid communication may be provided directly or via an intermediate passageway 128 as shown in FIGS. 6 and 7.

As shown in FIGS. 6, 7, 8, 11 and 12, the outlet passageway 126 preferably has a substantially smaller cross sectional area than the cross sectional area of the inlet passageway 108 to provide for the creation of thin veins. Exemplary diameters of the outlet passageway 126 may range from about 1/32 to about 1/16 of an inch. The inlet passageway 108 diameter may range from about 3/32 to about 1/4 of an inch. The optional intermediate passageway 128 may have a diameter in between that of the diameters of the inlet passageway 108 and outlet passageway 126. The outlet passageway 126 terminates in an outlet orifice 130 of the outlet portion 132 or nozzle portion of the injector 20.

The liquid composition is discharged from the outlet passageway 126 through the outlet orifice 130 into the chewing gum composition as the chewing gum composition flows in a direction from the upstream side 134 of the injector nozzle 132 to the downstream side 136 of the injector nozzle 132.

The outlet orifice 130 of the nozzle portion 132 is preferably covered by a flexible check valve 112. Fluid pressure from the liquid composition flowing out of the outlet orifice 130 due to pressure caused by the injection pumps or compressed air opens the valve 112 to permit flow of liquid composition onto the surface of the chewing gum mixture or into the interior of the chewing gum mixture. Back pressure from the chewing gum composition, created when the extruder is shut down, for example, closes the flexible check valve 112 and prevents clogging of the outlet passageway 130 by the chewing gum mixture.

The flexible check valve 112 may be constructed of a flexible plastic such as nylon, teflon, polyethylene, polypropylene, and the like. It may possess a cylindrical, or prismatic, or rectangular stem portion 140 and a larger head portion 142 as shown in FIGS. 14 and 15. The outlet end 144 and the outer surface of the stem portion 140 are configured to matingly close off the outlet orifice 130. For example, as shown in FIGS. 11, 12, and 13, the end portion 144 of the nozzle 132 may have a concave surface for receiving a cylindrical stem 140.

As shown in FIGS. 6 through 12, the flexible check valve 112 may be secured to the nozzle end 144 by inserting the stem portion 140 through a hole 150 or bore in a sleeve-like protruding portion 152 of the nozzle 20 at its upstream side 134. The bottom portion 143 of the head 142 butts against the protuberance 152 thereby preventing downstream movement of the valve 112. The flexible check valve 112 is hingedly held by the protuberance 152 or sleeve portion of the nozzle 132.

The outlet passageway 126 is preferably disposed at an angle $\alpha$ to the inlet passageway 108 so that the outlet orifice 130 is located downstream of the inlet orifice 124 and inlet passageway 106. The downstream location of the outlet orifice 130 provides for accommodation of a longer check valve stem 140 which facilitates its opening and closing. In addition, angling of the outlet passageway 126 provides for elongation of the outlet orifice 130 in a direction from the upstream side 134 to the downstream side 136 to promote the formation of veins.

An exemplary angle α formed by the longitudinal axis 155 of the outlet passageway 126 and the longitudinal axis 158 of the inlet passageway 108 may be from about 10° to about 55°, preferably from about 20° to about 30°.

As illustrated by FIGS. 6–10, the length of the nozzle or outlet portion 132 of the injector 20 may be sized to provide a desired injection depth. For example, surface injectors may have the shortest nozzle or end portion. Similarly, injectors for injecting liquid compositions at the central longitudinal axis 45 of the barrel 16 may have the longest nozzle 132 or outlet portion. Injection depth may also be controlled by the amount the injector 20 is screwed into the barrel 16 by means of the external and internal threads 116 and 118.

Surface Vein Alteration

In preferred embodiments of the present invention, liquid additive compositions are applied to the surface of the homogeneous mixture prior to extrusion by means of the surface injectors 20 to obtain substantially straight longitudinal veins. The straight longitudinal veins are preferably disrupted or partially distributed or partially reoriented in a direction which is at an angle to the longitudinal direction of the veins. In embodiments of the invention, the distribution, disruption, or reorientation of the surface longitudinal veins may be performed while the liquid composition is substantially still wet or is at least substantially dried. In embodiments of the invention, liquid composition may be applied to the surface of the extrudate after extrusion, using rotating roller applicators or sprays. However, surface application of the liquid composition is preferably performed prior to extrusion so as to reduce drying and curing times. It reduces equipment requirements and problems with stickiness due to the liquid composition after extrusion. Furthermore, when the liquid composition is pre-extrusion applied rather than post extrusion applied, the chewing gum composition remains flexible for a longer period of time in which twisting of the extrudate rope can occur.

In embodiments of the invention, the surface of the homogeneous mixture is subjected to twisting just prior to or during extrusion to partially distribute one or more of the veins of liquid composition on the surface of the homogeneous mixture. Twisting of the homogeneous mixture to partially distribute the surface liquid compositions across the surface of the homogeneous mixture may be accomplished by means of a surface vein displacement device 200 as shown in FIG. 16. The surface vein displacement device comprises a rotatable sleeve 202. The sleeve 202 may have an internal surface 204 which is at least partially in contact with the surface of the homogeneous mixture so that rotation of the sleeve 202 causes displacement of the liquid composition on the surface of the homogeneous mixture. The sleeve 202 may be rotatable in either a clockwise, and/or counterclockwise direction to produce different surface patterns. The rotatable sleeve 202 may be rotatably secured to the exit 50 of the extrusion head barrel 16 by means of a collar 206. A rubber ring seal 208 is preferably included for sealing engagement of the extruder barrel end 50 and the upstream end 210 of the sleeve 202. The sleeve 202 may be rotated manually by means of a handle 212 attached to its outer circumference or by the use of a motor and gears or pulleys (not shown) in known manner. The exit orifice 214 of the rotatable sleeve 202 serves to shape the extrudate rope into a desired shape or cross sectional configuration.

The rotatable sleeve 202 may include one or more protuberances 216 at its upstream end 210. The protuberances 216 may be set within bores 218 drilled at about a right angle to the central longitudinal axis 220 of the sleeve 202. The protuberances 216 may be removably secured within the bores 218 by means of a pressure fit or by screw threads or other known fastening means. The protuberances 216 may, for example, be disposed around the circumference of the sleeve 202 at 90° to each other. The protuberances 216 may extend into the chewing gum composition a distance sufficient to assist in twisting the chewing gum mixture about its central longitudinal axis as the chewing gum flows through the sleeve 202 past the protuberances 216.

In embodiments of the invention, the rotatable sleeve 202 or die plates may have serrated internal surfaces (not shown). Serrations tend to promote a striped appearance by displacing surface color to expose the gum color below the surface. Increasing the number of serrations, increases the number of stripes alternating between surface color and gum color.

Upon exiting the exit orifice 214 of the sleeve 202 or die plate, the extrudate rope may be cut into pieces in known manner.

In other embodiments of the present invention, the chewing gum composition is extruded with substantially straight longitudinal surface veins and then the extrudate may be subjected to twisting about its central longitudinal axis to displace the surface of the extrudate rope about the axis. In embodiments of the invention, the homogeneous chewing gum mixture may be subjected to twisting to partially distribute the liquid composition prior to extrusion, and then the extrudate rope may be subjected to additional twisting to displace its surface about its central longitudinal axis.

Gum Rope Twisting And Conveying Device

Figures 17, 18:
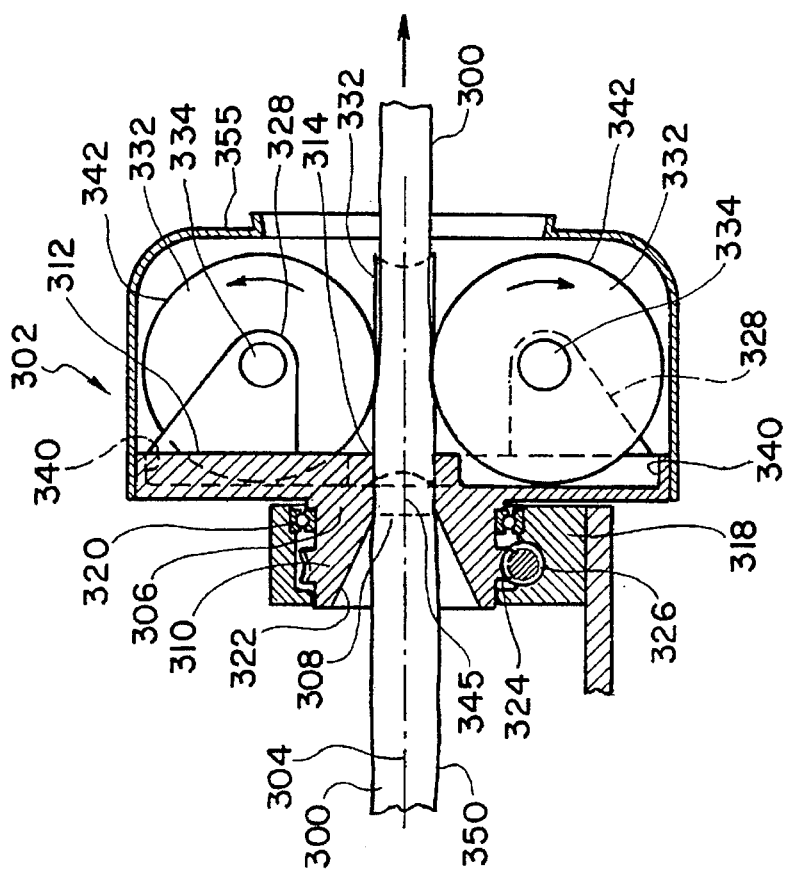
FIG. 17 is a side view of a gum rope rotating unit of the present invention.
FIG. 18 is a partial front view of the gum rope rotating unit of FIG. 17.

Twisting of the extrudate rope 300 is preferably performed in an apparatus 302, as shown in FIGS. 17 and 18, which simultaneously twists the rope 300 about its central longitudinal axis 304 while transporting it in a direction substantially parallel to its longitudinal axis 304. The twisting and conveying apparatus 302 may be located downstream of the extrusion head barrel 16 a sufficient distance which allows substantial drying of the liquid compositions on the surface of the extrudate 300. The distance may also be adjusted so that the twisting occurs while the extrudate rope 300 is sufficiently pliable or plastic to twist about its central longitudinal axis 304 without substantial cracking of the rope 300 or breaking of the rope 300. In preferred embodiments, the extrudate rope 300 is continuously fed to the remote twisting apparatus 302 as a continuous, uncut rope which is free to twist about its central longitudinal axis 304 between the twisting apparatus 302 and the extrusion barrel exit 50.

The gum rope twisting and conveying apparatus 302 comprises a rotatable body 306 having a central longitudinal opening 308 through which the gum rope 300 passes. The rotatable body 306 of the gum rope rotating unit 302 comprises a gum guide 310 or glide having a mounting plate 312 at its downstream end 314. The rotatable body 306 is mounted within a housing 318 having rotatable support bearings 320 for the rotatable body 306. The upstream end of the rotatable body 306 may include an opening 322 which narrows from the upstream direction to the downstream direction for guiding or gliding of the gum rope 300. The body 306 may be rotated by means of a worm gear 324 and worm 326 or other known means such as pulleys and belts, which are driven by a motor.

Roller supports 328 are attached to or mounted to the rotatable plate of the rotatable body 306. Mounting is preferably by means which permit vertical and horizontal adjustment of the position of the roller supports 328. For example, the plate 312 may contain vertical and/or horizontal slots 330 through which bolts 331 pass for securing the roller supports 328 in a fixed position relative to the plate 312. The plate 312 may contain one pair, preferably two pairs of roller supports 328 for supporting counterrotating 332 rollers. The position of the rollers 332 relative to each other is adjustable by means of the adjustable roller supports 328. The adjustment controls the size and shape of the opening through which the extrudate rope 300 passes, and hence its shape.

Each roller 332 is rotatably mounted on a roller support 328 by means of an axle 334, and roller securing means 336, such as a washer and bolt which fit on the axle 334. Each of the axles 334 preferably has its longitudinal axis 338 perpendicular, but spaced from the longitudinal axis 304 of the gum rope 300 so that rotation of the couterrotating rollers 332 about the roller axle axis 338 conveys or propels the extrudate rope 300 through the body opening 308 in a downstream direction. The plate 312 may be provided with openings or grooves 340 to accommodate large diameter rollers 332.

The roller supports 328 may be adjusted so that at least a portion of the outer periphery or circumference 342 of the roller wheels 332 contact or engage at least a portion of the width or height of the extrudate rope 300. In preferred embodiments of the invention, the peripheral or circumferential surface 342 of the counterrotating rollers 332 is concave shaped. The concave shaped gum contacting surface 342 provides gripping areas 344 at the outer edges of the rollers 332 for gripping the corners or outer edges of the gum rope 300. The curved surfaces 342 of the counterrotating rollers 332 and 342 may also serve to shape the outer periphery of the gum rope 300 to conform to the roller surface 342.

Rotation of the roller support plate 312 about its central longitudinal axis 345 causes twisting of the extrudate rope 300 as it is conveyed by the counterrotating rollers 332 in the direction of the rope's longitudinal axis 304. The roller support plate 312 may be rotated or twisted in a clockwise direction or counter clockwise direction to displace the surface 350 of the extrudate rope 300 about its longitudinal axis 304.

The counterrotating rollers 332 may be driven independently of the rotatable plate 312 upon which they are mounted. For example, motors may be mounted on the rotatable plate 312 for driving the counterrotating rollers 332. In other embodiments, gears such as worm gears or pulleys may be used to drive the counterrotating rollers 332. A cover or guard 355 may be attached to the housing 318.

In other embodiments of the invention, a device located downstream of the gum rope rotating unit 302, such as a conveyor belt or counterrotating rollers may be used to assist in propelling or conveying the rope through the gum rotating unit 302.

After exiting the gum rope rotating unit 302, the twisted extrudate rope 300 may be cut into chewing gum size pieces using conventional gum cutting equipment. The gum may be dusted and wrapped in conventional manner.

Chewing Gum Composition And Method

The amount of gum base used may vary depending on various factors such as the type of gum bases used, consistency desired and other components used to make the final product. Exemplary, amounts of gum base which may be employed are about 5% to about 60% by weight of the final chewing gum composition (i.e. by weight of the total composition), with preferred amounts being about 18% to about 40% by weight and most preferred amounts being about 15% to about 25% by weight. The gum base employed in the present invention may be any water-insoluble gum base well known in the art. Illustrative examples of polymers in gum bases include both natural and synthetic elastomers and rubbers. For example, polymers in gum bases include substances of vegetable origin such as chicle, crown gum, nispero, rosidinha, jelutong, perillo, niger gutta, tunu, balata, gutta-percha, lechi-capsi, sorva, mixtures thereof, and the like. Synthetic elastomers such as butadienestyrene copolymers, polyisobutylenes, isobutyleneisoprene copolymers, polyethylenes, polyvinylacetates, mixtures thereof, and the like may also be used. Preferred polyvinylacetates are low and high molecular weight polyvinylacetates. Generally a low molecular weight polyvinylacetate is one whose molecular weight is less than about 16,000, with about 2,500 to about 16,000 being suitable. A high molecular weight polyvinylacetate is one whose molecular weight is above about 55,000.

Chewing gum additives which may be used in effective amounts with the gum bases include flavoring agents, bulking agents, sweetening agents, therapeutic agents, mouth fresheners, emulsifiers, fillers, coloring agents, softeners, plasticizers, waxes, elastomer solvents, antioxidants (such as BHA and BHT), and the like.

The bulking agents may be used in amounts effective to provide the desired amount of bulk to the gum base. Bulking agents which may be used include sweetening agents selected from the group consisting of monosaccharides, disaccharides, polysaccharides, sugar alcohols, and mixtures thereof. Other bulking agents include polydextrose, maltodextrins and minerals such as calcium carbonate, talc, titanium dioxide, dicalcium phosphate, and the like. Bulking agents may be used in amounts up to about 90% by weight of the final gum composition with amounts of about 65% to about 85% being preferred.

The gum base compositions may contain conventional elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents which may be used include pentaerythritol ester of partially hydrogenated wood or gum rosin, pentaerythritol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin, and partially hydrogenated methyl ester of rosin and mixtures thereof. The elastomer solvent may be employed in an amount ranging from about 10% to about 75% and preferably about 45% to about 70% by weight of the gum base.

Ingredients used as plasticizers or softeners such as lanolin, stearic acid, sodium stearate, potassium stearate, glycerol triacetate, glycerin, lecithin, and glycerol monostearate and the like, may also be incorporated into the gum base to obtain a variety of desirable textures and consistency properties. Waxes, for example, natural waxes, petroleum waxes such as polyurethane waxes, paraffin waxes and microcrystalline waxes may also be incorporated into the gum base to obtain a variety of desirable textures and consistency properties. These ingredients may be employed in amounts of up to about 30% by weight and preferably in amounts of from about 3% to about 20% by weight of the final gum base composition.

The chewing gum composition may also include: a) flavoring agents or flavorants, b) coloring agents such as titanium dioxide, c) emulsifiers such as lecithin and glycerol monostearate, and d) additional fillers such as aluminum hydroxide, alumina, aluminum silicates, calcium carbonate, and talc. Combinations of these conventional additives are contemplated. These fillers may also be used in the gum base in various amounts. Preferably the amount of fillers when used will vary from about 4% to about 30% by weight of the final chewing gum.

The chewing gum compositions employing the gum bases generally contain sweetening agents (sweeteners). The sweetening agent may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof.

Exemplary water-soluble sweetening agents which may be used are: monosaccharides, disaccharides and polysaccharides such as xylose, ribose, glucose (dextrose), mannose, galactose, fructose (levulose), lactose, sucrose (sugar), maltose, invert sugar (a mixture of fructose and glucose derived from sucrose), partially hydrolyzed starch, corn syrup solids, corn syrup, high fructose corn syrup, dihydrochalcones, monellin, steviosides, glycyrrhizin, and sugar alcohols such as sorbitol, xylitol, mannitol, maltitol, hydrogenated starch hydrolysates and mixtures thereof. A preferred sweetener for use in embodiments of the present invention comprises a high DE corn syrup to improve resealing of the gum base into a unitary mass downstream of the injection nozzles to reduce puddling or excessive accumulation of the injected liquid additive composition. The high DE corn syrups which may be used may have a DE of at least about 48, preferably from about 58 to about 68.

Exemplary water-soluble artificial sweeteners which may be used are the soluble saccharin salts, i.e., sodium or calcium saccharin salts, cyclamate salts, acesulfame-K and the like, and the free acid form of saccharin.

Exemplary dipeptide based sweeteners include L-aspartyl-L-phenylalanine methyl ester and materials described in U.S. Pat. No. 3,492,131, L-α-aspartyl-N-(2,2, 4,4-tetramethyl-3-thietanyl)-D-alaninamide hydrate, and the like.

Water-soluble sweeteners derived from naturally occurring water-soluble sweeteners which may be used in the present invention include a chlorinated derivative of ordinary sugar (sucrose), known, for example, under the product designation of sucralose.

An example of a protein based sweetener which may be used is thymidine.

In general, the amount of sweetener will vary with the sweetener selected for a particular chewing gum composition. Thus, for any given sweetener a sufficient amount of sweetener is used to provide the end result desired. For example, an effective amount of sweetener is utilized to provide the level of sweetness desired. This amount may be from about 0.005% to about 90% by weight of the final chewing gum composition. In embodiments of the present invention, the water-soluble sweetening agents such as the mono-, di-, and polysaccharides may be used in amounts up to about 90%, preferably from about 25% to about 75% by weight, more preferably in amounts of about 50% to about 65% by weight of the final chewing gum composition. Some of the sweetening agents which are of higher intensity, such as glycyrrhizin, the artificial sweeteners, the dipeptide based sweeteners, the sweeteners derived from naturally occurring sweeteners, and the protein-based sweeteners may be used in much smaller amounts. The high intensity sweeteners may be used in amounts of about 0.005% to about 5.0% and most preferably about 0.005% to about 2.5% by weight of the final chewing gum composition. These amounts are ordinarily necessary to achieve a desired level of sweetness independent from the flavor level achieved from flavor oils.

When high amounts of injected color and/or flavor additives are present in the gum, the possibility exists that a bitterness from the flavor due to concentration can be perceived. By the addition of minor amounts of intense sweetener, for example, as low as 0.1% of the injection material, flavor bitterness is eliminated and actual or desired flavor perception is dramatically improved.

Natural and synthetic flavoring agents or flavorants well known to the chewing gum art may be added in effective amounts to the chewing gum compositions of the instant invention. These flavoring agents may be chosen from synthetic flavor oils and flavoring aromatics, and/or oils, oleo resins and extracts derived from plants, leaves, flowers, fruits, and so forth, and combinations thereof. Representative flavor oils include: spearmint oil, cinnamon oil, oil of wintergreen (methysalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot, watermelon and so forth. These flavoring agents may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such is cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modified, many types), decanal (citrus fruits), aldehyde C-8 (citrus fruits), aldehyde C-9 (citrus fruits), aldehyde C-12 (citrus fruits), 2-ethyl butraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing dried forms are well known and do not constitute a part of this invention.

The flavoring agents of the present invention may be used in many distinct forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional material such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candelilla wax, lanolin, bayberry wax, sugarcane wax, spermaceti wax, rice bran wax, and mixtures thereof.

The fats and waxes may be used individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed is subject to such factors as flavor type, gum base type and strength desired. Exemplary amounts are from about 0.25% to about 5.0% by weight, preferably from about 0.5% to about 3% by weight, based upon the final chewing gum composition.

The coloring agents or colorants are used in amounts effective to produce the desired color intensity and pattern. Exemplary amounts range up to about 10% by weight, preferably from about 1% to about 7% weight of the final chewing gum composition. Exemplary coloring agents (colorants) for use in the present invention, include pigments such as titanium dioxide which may incorporated in amounts up to about 2% by weight of the final chewing gum composition. Colorants may also include natural food colors and dyes suitable for food, drug and cosmetic applications. These colorants are known as F.D. & C dyes and lakes. The preferred colorants are preferably water-soluble. Exemplary colorants include: a) indigoid dye, known as F.D. & C. Blue No. 2, which is the disodium salt of 5,5-indigotindisulfonic acid, and b) the dye known as F.D. & C Green No. 1 which comprises a triphenylmethane dye and is the monosodium salt of 4-[4-(N-ethyl-p-sulfoniumbenzylamino) diphenylmethylene]-[1-N-ethyl-N-p-sulfoniumbenzyl]-$\Delta$-2, 5-cyclohexadienimine]. Other F.D. & C colorants and their corresponding chemical structures may be found in the Kirk-Othmer Encyclopedia of Chemical Technology, 2nd edition, Volume 5, Pages 857–884, which text is incorporated herein by reference.

Exemplary therapeutic additives which may be used in the compositions of the present invention include pharmaceuticals, such as tetracycline, erythromycin, and other antibiotics, cough remedies, cough suppressants, and the like. They may used in pharmaceutically and therapeutically effective amounts. Exemplary amounts are up to about 2% by weight of the final gum composition.

Exemplary amounts of breath freshening agents range up to about 3% by weight of the final gum composition.

The substantially homogeneous chewing gum composition into which the plurality of liquid compositions are injected may be produced in conventional manner in a batch mixer, continuous mixer or extruder. For example, one or more gum bases may be heated to a temperature sufficiently high enough to soften the at least one base without adversely affecting the physical and chemical make up of the base. The optimum temperatures utilized may vary depending on the composition of the gum base used, but such temperatures are readily determined by those skilled in the art without undue experimentation. Exemplary temperatures are within the range of about 60° to about 90° C. A softener may then be added and mixed with the gum base to obtain a homogeneous pliable mixture. While mixing, a bulking agent may added incrementally to the homogeneous pliable mixture until a homogeneous mass is obtained. Then materials such as a flavoring agent as well as other traditional additives may be added incrementally and mixed until a substantially homogeneous mass or mixture is obtained. These materials may be the same or different from the ingredients of the liquid compositions which are to be injected into the substantially homogeneous mixture.

The total amount of the liquid compositions injected into and onto the substantially homogeneous chewing gum mixture may range, for example, from about 0.2% by weight to about 10% by weight, preferably from about 0.5% by weight to about 6% by weight of the total weight of the final chewing gum composition. The amount of liquid composition injected through each injection nozzle may be the same or different. The injected liquid composition may be solid or semi-solid at room temperature and then heated to the liquid state for injection.

In preferred embodiments of the invention, the injected liquid compositions are aqueous based. Exemplary water contents may range from about 10% by weight to about 70% by weight of the injected liquid composition. The injected liquid compositions preferably comprise corn syrup as a source of water and as a source of sugar solids. Exemplary amounts of corn syrup may range from about 10% by weight to about 80% by weight, preferably from about 40% by weight to about 70% by weight of the injected liquid composition. The injected liquid compositions preferably comprise a readily crystallizable sugar, such as sucrose. Exemplary amounts of sucrose range from about 3% by weight to about 35% by weight, preferably from about 5% by weight to about 15% by weight of the injected liquid composition. The amounts of added water, sucrose, and corn syrup should provide a pumpable liquid mixture which dries and crystallizes to a non-sticky consistency for wrapping within a period of preferably less than about five minutes. Crystallization times and drying times may be reduced by cooling the gum extrudate in conventional manner.

The injected liquid compositions preferably include a thickening agent or viscosity control agent such as acacia gum or guar gum or other natural edible gums or pregelatinized or modified starches. Exemplary amounts of the viscosity control agent may range from about 0.2% to about 5% by weight, preferably from about 0.5% to about 3% by weight of the liquid composition.

The injected liquid compositions may also include pigments, such as titanium dioxide. Exemplary amounts range from about 0.1% by weight to about 6% by weight, preferably from about 0.2% by weight to about 1% by weight.

Exemplary amounts of chewing gum additives, such as dyes, lakes, high intensity sweeteners, flavorants, therapeutic agents, breath fresheners, and mixtures thereof may range from about 5% by weight to about 25% by weight of the injected liquid composition. The liquid compositions also preferably comprise an effective amount of a food grade preservative such as sodium benzoate, methylparaben, sodium hydroxide, or mixtures thereof. Exemplary amounts of preservatives may range up to about 1% by weight of the liquid composition.

The liquid compositions preferably have a water activity of less than about 0.7 and are preferably shelf stable for periods of at least about two months. Exemplary viscosities of the injected liquid composition may range from about 40° to about 45° Baumé.

The substantially homogeneous chewing gum mixture may be transferred to or formed in a mixing and conveying device such as a twin screw extruder or continuous mixer which is equipped with an extrusion head having injectors for injection of the liquid compositions downstream of the conveying and mixing screws. The gum composition may be at a temperature about 70° F. to about 140° F., preferably from about 90° F. to about 110° F. during injection of the liquid additive compositions. The chewing gum ingredients may be heated in the mixing and conveying device before entry into the extrusion head and/or while the chewing gum mixture is passing through the extrusion head.

After injection of the liquid compositions, the chewing gum compositions are extruded into ropes preferably having a rectangular, square, elliptical, or circular cross section. Rectangular shapes are most preferred for ease of wrapping and packaging. The multi-veined chewing gum pieces of the present invention are preferably in slab gum form. However, the multi-veined gums may be processed into other forms such as shredded gum, hard coated gum, tabletted gum, center-filled gum, and stick gum.

In preferred embodiments of the present invention, multi-colored and multi-flavored chewing gum 400, as exemplified in FIGS. 19–23, is produced having a plurality of internal veins 402, 404, 406, and 408 having two or more different flavors and different colors from each other. In addition, the at least two veins 402, 404, 406, and 408 having a different color preferably extend from one cut end 410 to the other cut end 412 but form substantially different visible patterns in each opposing cut end 410, 412 as shown in FIGS. 20 and 21.

The preferred chewing gum pieces of the present invention further include a plurality of surface veins 420 on the outer surface 450 or longitudinal surface which extends between the cut ends 410, 412. At least two of the surface veins 420 preferably have a different flavor and different color from each other. Surface veins 420 which outnumber the number of injectors 20 may be created by partial overlapping of two adjacent colors to produce a third color in between the two veins. The overlapping may be achieved by controlling the flow of liquid composition and/or by the use of a surface vein disrupter such as shown in FIG. 16 or FIGS. 17–18. The internal mixer 52 may also be used to disrupt internal veins so that they appear internally as well as at the surface of the chewing gum piece.

The surface veins 420 may have a flavor and color different from or the same as those of the internal veins 402, 404, 406, 408. In preferred embodiments of the invention, the surface veins are displaced in a circumferential direction from their originally applied positions. For example, originally applied substantially straight longitudinal surface veins may be displaced so as to form a helical pattern on the surface of the gum.

The present invention is further illustrated in the following examples. All temperatures are in degrees F., and all percentages, ratios, and proportions are by weight unless indicated to the contrary:

EXAMPLE 1

The ingredients and there relative amounts which may be used to produce a multi-colored and multi-flavored chewing gum in accordance with the present invention are:

| Chewing Gum Mixture | | |
| --- | --- | --- |
| Ingredients | Amount Parts By Weight | Preferred Amount Parts By Weight |
| Gum Base | 15–40 | 18–25 |
| Corn Syrup (about 43° Baumé) | 5–20 | 8–60 |
| Powdered Sugar (sucrose) | 45–70 | 50–60 |
| High Fructose Corn Syrup (about 68–72% solids) | 1–10 | 3–7 |
| Lecithin | 0–3 | 0.1–2 |
| Titanium Dioxide Pigment | 0.1–3 | 0.5–1.5 |
| Fruit Flavors (water soluble and water insoluble) | 0.2–2 | 0.5–1.5 |
| Citric Acid | 0–4 | 0.5–2.0 |
| TOTAL | 100 | 100 |

| Injected Liquid Compositions | | |
| --- | --- | --- |
| Ingredients | Amount Parts By Weight | Preferred Amount Parts By Weight |
| Water | 5–40 | 10–25 |
| Sucrose | 3–35 | 5–15 |
| Titanium Dioxide | 0.1–6 | 0.2–1 |
| Lakes and Dyes (powdered) | 5–20 | 9–18 |
| Acacia Gum | 0.2–5 | 0.5–3 |
| Corn Syrup (about 43° Baumé) | 10–80 | 40–70 |
| TOTAL AMOUNT | 100 | 100 |

The chewing gum mixture may be prepared by melting the gum base and placing it in a standard dough mixer kettle equipped with sigma blades. The corn syrup, high fructose corn syrup, and lecithin may then be added and mixed for about three minutes at about 200° F. Thereafter, the sucrose, titanium dioxide pigment, fruit flavors, and citric acid may be added and blended with the mixed ingredients for about 5 minutes at a temperature of about 160° F. The resulting substantially homogeneous chewing gum mixture may then be discharged from the kettle and into the hopper of a twin screw chewing gum extruder having an extrusion head and a plurality of extrusion head barrels as shown in FIG. 1.

Eight liquid compositions each having a different color may be produced by admixing water, sucrose, titanium dioxide, acacia gum, corn syrup, and a preservative with eight different lakes or dyes to obtain eight differently colored liquid mixtures at a temperature of about 75° F. to about 85° F. The colors of the eight liquid compositions may be blue, yellow, red, light green, dark green, purple, red punch, and orange. The eight differently colored liquid compositions may be fed to the twelve injectors of each barrel as follows: 1) the blue liquid composition may be injected into one interior injector and one surface injector, 2) the yellow liquid composition may be injected into one interior injector and one surface injector, 3) the red liquid composition may be fed to two surface injectors, 4) the light green liquid composition may be fed to one surface injector and one interior injector, 5) the orange liquid composition may be fed to a surface injector, and 6) each of the dark green, purple, and red punch liquid compositions may be fed to separate interior injectors.

The liquid compositions may be fed to the twelve injectors of each barrel at a rate which provides a total amount of injected liquid compositions of about 0.5% by weight to about 1.5% by weight based upon the total weight of each extrudate chewing gum rope. The feed rates to each of the injectors may be the same or different but are preferably higher to the surface injectors so as to cover substantially the entire longitudinal surfaces of the extrudate rope. The impellers located in each of the extrusion head barrels may be rotated at about 200 rpm to partially disrupt the essentially straight internal longitudinal colored veins without substantially disrupting the surface veins of color.

Upon extrusion, each extrudate rope may be subjected to cooling and drying at conventional chewing gum cooling and drying temperatures for a sufficient period of time to permit substantial drying and crystallization of the surface colors.

The cooled extrudate rope may be fed directly into a gum rope twisting device of the present invention to displace the surface veins of color about the central longitudinal axis of the gum rope. The gum ropes may then be dusted, cut into slabs or blocks and then wrapped and packaged in conventional manner.

EXAMPLE 2

Chewing gum may be produced as in Example 1, except a rotatable sleeve may be used to disrupt the surface veins on the homogeneous mixture as it is extruded from each extrusion head barrel. The gum ropes may then be cooled, dried, dusted, cut into slabs or blocks, and then wrapped and packaged as in Example 1.

EXAMPLE 3

Multi-colored chewing gum may be produced as in Example 1, except fruit flavors associated with two or more of the eight colors may be included in a plurality of the liquid compositions in an amount of about 5% by weight to about 10% by weight of each liquid composition. For example, a blueberry flavor may be included with the blue liquid composition, a banana flavor may be included with the yellow liquid composition, a cherry flavor may be included with the red liquid composition, and an orange flavor may be included with the orange colored liquid composition.

EXAMPLE 4

Multi-colored chewing gum may be produced as in Example 1, except three separate substantially homogeneous chewing gum mixtures, which differ only in color and flavor may be separately prepared. The three gum mixtures may be fed through a coextrusion die to form a triple layer laminated chewing gum composition. The thickness of each layer may be substantially the same. The coextrusion die may be located in an extrusion head adapter for feeding the triple laminate to an extrusion head barrel equipped with injectors as shown in FIG. 1. One chewing gum mixture may be green colored and lime flavored, another may be red colored and cherry flavored, and the third substantially homogeneous chewing gum mixture may be yellow colored and banana flavored. The green layer may be injected with at least one red colored cherry flavored liquid composition. The red chewing gum mixture or layer may be injected with at least one yellow colored banana flavored liquid composition. The yellow layer may be injected with at least one green colored lime flavored liquid composition. The impeller located in the extrusion head barrel may be rotated to partially disrupt the essentially straight internal longitudinal colored veins and to partially disrupt the essentially straight three layers of chewing gum mixtures without substantially disrupting the surface of the laminated gum composition.

What is claimed is:

1. A method for the production of chewing gum comprising the steps of:
    a) admixing chewing gum ingredients comprising a gum base, to obtain a substantially homogenous mixture,
    b) injecting a plurality of liquid compositions that are solid or semi-solid at room temperature comprising at least one chewing gum additive into said homogeneous mixture at separate locations within said homogeneous mixture,
    c) partially mixing said homogenous mixture to partially distribute at least one of said injected liquid compositions in said homogenous mixture,
    d) extruding the homogeneous mixture to obtain at least one extrudate rope, each rope having discrete regions of said additive,
    e) cooling said extrudate rope so that said liquid compositions are of non-sticky consistency, and
    f) cutting said at least one extrudate rope into pieces each having cut ends, said pieces having a plurality of discrete regions of said additive at separate locations on the surface of at least one of the cut ends of the pieces.

2. A method as claimed in claim 1 further comprising applying at least one liquid composition to the surface of said homogenous mixture.

3. A method as claimed in claim 1 further comprising applying at least one liquid composition to the surface of said homogeneous mixture.

4. A method as claimed in claim 2 wherein at least one liquid composition is applied to the surface of said homogeneous mixture prior to extrusion.

5. A method as claimed in claim 3 wherein at least one liquid composition is applied to the surface of said homogeneous mixture prior to extrusion.

6. A method as claimed in claim 1 wherein at least one of said injected liquid compositions comprises a colorant.

7. A method as claimed in claim 2 wherein at least one of said injected liquid compositions and at least one of said surface applied liquid compositions comprises a colorant.

8. A method as claimed in claim 2 wherein the surface of said homogeneous mixture is subjected to twisting to partially distribute said at least one liquid composition on the surface of the homogeneous mixture.

9. A method as claimed in claim 2 wherein said at least one liquid composition on the surface of said extrudate is at least substantially dried, and the extrudate is twisted prior to cutting to displace the dried liquid composition on the surface of the extrudate with respect to the central longitudinal axis of the extrudate.

10. A method as claimed in claim 3 wherein said at least one liquid composition on the surface of said extrudate is at least substantially dried, and the extrudate is twisted prior to cutting to displace the dried liquid composition on the surface of the extrudate with respect to the central longitudinal axis of the extrudate.

11. A method as claimed in claim 8 wherein said twisting is performed prior to substantial drying of said at least one liquid composition on the surface of said extrudate rope.

12. A method as claimed in claim 1 wherein said homogeneous mixture is formed in an extruder at a temperature of about 90° to about 110° F.

13. A method as claimed in claim 1 wherein said homogeneous mixture is formed in an extruder and said injecting of the liquid compositions occurs at a plurality of radial positions and at a plurality of longitudinal positions within the homogeneous mixture as it is conveyed through the extruder.

14. A method as claimed in claim 13 further comprising applying a plurality of liquid compositions to the surface of the homogeneous mixture as it is conveyed through the extruder.

15. A method as claimed in claim 1 wherein the substantially homogeneous mixture is divided into a plurality of streams, said injection of the plurality of liquid compositions being into the plurality of streams so as to obtain a plurality of said extrudate ropes.

16. A method as claimed in claim 13 wherein said plurality of liquid compositions injected into said homogeneous mixture comprise different colorants, and a plurality of different colorants are visible in the cut ends of the pieces.

17. A method as claimed in claim 14 wherein the liquid compositions injected into said homogeneous mixture at said radial and longitudinal positions comprise different colorants.

18. A method as claimed in claim 17 wherein the liquid compositions applied to the surface of the homogeneous mixture comprise different colorants.

19. A method as claimed in claim 1 wherein said chewing gum additive is at least one member selected from the group consisting of colorants, flavorants, sweeteners, mouth freshening agents, and therapeutic agents.

20. A method for the production of chewing gum comprising the steps of
    a) admixing chewing gum ingredients comprising a gum base, to obtain a substantially homogenous mixture,
    b) injecting a plurality of different liquid coloring compositions that are solid or semi-solid at room temperature into said homogeneous mixture at separate locations within said homogeneous mixture,
    c) partially mixing said homogenous mixture so as to partially distribute at least one of said injected coloring compositions in said homogeneous mixture,
    d) extruding the homogeneous mixture to obtain an extrudate rope,
    e) cooling said extrudate rope so that said liquid compositions are of non-sticky consistency, and
    f) cutting the extrudate rope into pieces having a plurality of said liquid coloring compositions visible in the cut ends of the pieces.

21. A method as claimed in claim 20 further comprising applying at least one liquid coloring composition to the surface of said homogeneous mixture.

22. Chewing gum comprising a substantially homogeneous mixture of chewing gum ingredients and a plurality of substantially discrete marbleized veins, at least two of the veins having a different composition from each other and from said substantially homogeneous chewing gum mixture, said veins being obtained by injecting liquid compositions that are solid or semi-solid at room temperature comprising at least one chewing gum additive into said substantially homogeneous mixture of chewing gum ingredients, mixing the substantially homogeneous mixture of chewing gum ingredients to only partially distribute the liquid compositions, and then cooling said homogeneous mixture so that said liquid compositions are of non-sticky consistency, said chewing gum having a substantially homogeneous chewing gum base.

23. Chewing gum as claimed in claim 22 wherein said at least one chewing gum additive is at least one member selected from the group consisting of colorants, flavorants, sweeteners, mouth freshening agents, and therapeutic agents.

24. Chewing gum as claimed in claim 22 wherein said chewing gum has opposing cut ends, and said veins comprise a colorant and are visible at said cut ends.

25. Chewing gum as claimed in claim 24 wherein a plurality of different colored and flavored veins form a pattern visible at the cut ends and the pattern at one of the opposing cut ends differs substantially from the pattern at the other opposing cut end.

26. Chewing gum as claimed in claim 24 wherein the surface of the chewing gum between said opposing cut ends comprises veins which form a multi-colored pattern.

27. Chewing gum comprising a substantially homogeneous mixture of chewing gum ingredients having two opposing cut ends and an outer surface extending between said cut ends, a plurality of substantially discrete internal veins of at least one chewing gum additive within said mixture, said veins being obtained by injecting liquid compositions that are solid or semi-solid at room temperature comprising said at least one chewing gum additive into said substantially homogeneous mixture of chewing gum ingredients, mixing the substantially homogeneous mixture of chewing gum ingredients to only partially distribute the liquid compositions, and then cooling said homogeneous mixture so that said liquid compositions are of non-sticky consistency, at least two of said substantially discrete internal veins having a different flavor and a different color from each other and from said substantially homogeneous mixture of chewing gum ingredients, said at least two veins extending from one cut end to the other cut end, and a plurality of surface veins of at least one chewing gum additive on said outer surface, at least two of said surface veins having a different flavor and a different color from each other, said surface veins being obtained by applying liquid compositions to said outer surface and allowing said liquid compositions to dry, said chewing gum having a substantially homogeneous chewing gum base.

28. Chewing gum as claimed in claim 27 wherein said surface veins form a helical pattern.

29. A method for the production of chewing gum comprising:
    a) injecting a plurality of liquid compositions that are solid or semi-solid at room temperature comprising at least one chewing gum additive into a coextrudate comprising a plurality of chewing gum compositions at separate locations within said coextrudate,
    b) partially mixing said coextrudate so as to only partially distribute at least one of said injected liquid compositions,
    c) extruding the coextrudate to obtain a chewing gum rope having discrete regions of said additive, and
    d) cooling said chewing gum rope so that said liquid compositions are of non-sticky consistency, and
    e) cutting said extrudate rope into pieces each having cut ends, said pieces having a plurality of discrete regions of said additive at separate locations on the surface of at least one of the cut ends of the pieces.

30. A method as claimed in claim 29 wherein said coextruded chewing gum comprises at least two differently colored layers and at least one liquid composition is injected into each layer.

31. Chewing gum comprising two opposing cut ends and an outer surface extending between said cut ends, said chewing gum comprising at least two distinct differently colored substantially homogeneous chewing gum compositions, and a plurality of substantially discrete internal veins of at least one chewing gum additive, said internal veins being obtained by injecting liquid compositions that are solid or semi-solid at room temperature comprising said at least one chewing gum additive into said substantially homogeneous chewing gum compositions, mixing the substantially homogeneous chewing gum compositions to only partially distribute the liquid compositions, and then cooling said homogeneous chewing gum compositions so that said liquid compositions are of non-sticky consistency, the substantially discrete internal veins being within at least one of said substantially homogeneous chewing gum compositions, at least two of said substantially discrete internal veins having a different flavor and/or different color from each other and from the substantially homogeneous chewing gum composition the vein is within, said at least two veins extending from one cut end to the other cut end, said substantially discrete internal veins forming a visible pattern in each opposing cut end.

32. Chewing gum as claimed in claim 31 wherein each differently colored chewing gum composition has at least one substantially discrete internal vein.

33. A method for producing chewing gum comprising the steps of injecting a plurality of different liquid compositions that are solid or semi-solid at room temperature into a substantially homogeneous gum base composition while the gum composition is being conveyed in one or more extruder head barrels, the injection being at a plurality of radial and/or circumferential positions in the barrel to obtain a plurality of substantially straight longitudinal veins of color, partially mixing the longitudinal veins to partially displace the veins in a direction transverse to the direction of extrusion so as to create veined, multi-colored patterns substantially throughout a cross section of the extrudate product in a manner so that the multi-colored patterns in the cross-section differ along the length of the extrudate, cooling the extrudate so that said liquid compositions are of non-sticky consistency, and cutting the extrudate to obtain gum pieces having different veins of injected liquid additives which provide a swirled or marbleized pattern in the opposing cut ends.

34. A method as claimed in claim 33 wherein surface veins are produced by applying liquid colorant compositions onto the substantially homogeneous gum base composition as it passes through the extrusion head barrel, and the surface veins are disrupted or displaced independently of the interior veins.

35. Chewing gum comprising a substantially homogeneous mixture of chewing gum ingredients and a plurality of substantially discrete capillary veins consisting essentially of at least one chewing gum additive, said substantially discrete capillary veins being obtained by injecting liquid additive compositions that are solid or semi-solid at room temperature comprising said additive into said substantially homogeneous mixture of chewing gum ingredients, mixing said substantially homogeneous mixture of chewing gum ingredients to only partially distribute the liquid compositions, and then cooling the homogeneous mixture of chewing gum ingredients so that said liquid compositions are of non-sticky consistency, said chewing gum having a substantially homogeneous chewing gum base.

36. Chewing gum as claimed in claim 35 wherein said liquid additive compositions are about 15% to 25% miscible with said chewing gum base.

* * * * *